(12) United States Patent
So et al.

(10) Patent No.: US 11,244,388 B2
(45) Date of Patent: Feb. 8, 2022

(54) METHODS AND SYSTEMS FOR ASSESSING PERFORMANCE AND RISK IN FINANCING SUPPLY CHAIN

(71) Applicant: FLOWCAST, INC., Burlingame, CA (US)

(72) Inventors: Kenneth So, Burlingame, CA (US); James Patrick McGuire, Lake Arrowhead, CA (US); Eitan Anzenberg, Emeryville, CA (US)

(73) Assignee: Flowcast, Inc., Burlingame, CA (US)

( * ) Notice: Subject to any disclaimer, the term of this patent is extended or adjusted under 35 U.S.C. 154(b) by 17 days.

(21) Appl. No.: 16/000,872

(22) Filed: Jun. 5, 2018

(65) Prior Publication Data

US 2018/0357714 A1 Dec. 13, 2018

Related U.S. Application Data

(60) Provisional application No. 62/517,122, filed on Jun. 8, 2017.

(51) Int. Cl.
| | |
|---|---|
| *G06F 17/18* | (2006.01) |
| *G06Q 40/02* | (2012.01) |
| *G06N 20/00* | (2019.01) |
| *G06N 5/02* | (2006.01) |
| *G06N 7/00* | (2006.01) |
| *G06N 5/04* | (2006.01) |

(52) U.S. Cl.
CPC ........... *G06Q 40/025* (2013.01); *G06F 17/18* (2013.01); *G06N 5/022* (2013.01); *G06N 7/005* (2013.01); *G06N 20/00* (2019.01); *G06N 5/048* (2013.01)

(58) Field of Classification Search
None
See application file for complete search history.

(56) References Cited

U.S. PATENT DOCUMENTS

| | | | |
|---|---|---|---|
| 7,103,570 B1* | 9/2006 | Morea | G06Q 20/382 705/26.1 |
| 9,203,860 B1* | 12/2015 | Casillas | G06F 21/46 |
| 9,727,912 B1 | 8/2017 | Poursartip et al. | |
| 2002/0194122 A1* | 12/2002 | Knox | G07F 19/20 705/39 |

(Continued)

*Primary Examiner* — William J Jacob
(74) *Attorney, Agent, or Firm* — Kania Radhakrishnan; Evergreen Valley Law Group

(57) ABSTRACT

Methods and systems for assessing performance and risk in financing supply chain are disclosed. The method includes accessing a behavioral data of an entity. The behavioral data comprises at least one of a primary data and a secondary data. The primary data is associated with one or more assets of the entity and comprises historical transaction data of the entity with financial institutions. The secondary data is sourced from an external system and comprises at least a credit information and a business transaction information of the entity. The method also includes generating a unified model for the entity based on the behavioral data of the entity. The method includes predicting a plurality of risk metrics based on the unified model using one or more machine learning models, and determining a credit rating of the entity based on the plurality of risk metrics and a confidence measure.

18 Claims, 13 Drawing Sheets

(56) References Cited

U.S. PATENT DOCUMENTS

| | | | |
|---|---|---|---|
| 2003/0236688 A1* | 12/2003 | Kadaba | G06Q 30/0283 705/6 |
| 2005/0125259 A1* | 6/2005 | Annappindi | G06Q 40/08 705/4 |
| 2005/0262013 A1* | 11/2005 | Guthner | G06Q 40/08 705/38 |
| 2006/0095374 A1 | 5/2006 | Lo et al. | |
| 2008/0288405 A1* | 11/2008 | John | G06Q 20/384 705/44 |
| 2009/0228294 A1* | 9/2009 | Choi | G06Q 90/00 705/317 |
| 2009/0248488 A1 | 10/2009 | Shah et al. | |
| 2012/0221485 A1* | 8/2012 | Leidner | G06Q 10/0635 705/36 R |
| 2012/0221486 A1* | 8/2012 | Leidner | G06Q 10/0635 705/36 R |
| 2012/0316916 A1* | 12/2012 | Andrews | G06Q 10/0635 705/7.28 |
| 2014/0358768 A1 | 12/2014 | Blount et al. | |
| 2016/0086184 A1* | 3/2016 | Carpenter | G06Q 20/4016 705/44 |
| 2016/0104159 A1* | 4/2016 | Butterfield | G06Q 20/384 705/44 |
| 2017/0054750 A1 | 2/2017 | Ward | |
| 2018/0033089 A1* | 2/2018 | Goldman | G06Q 40/10 |

* cited by examiner

INVOICE 508

| 502 → INVOICE ID: | INVOICE DATE: ← 504 |
| 506 → CUSTOMER ID: | INVOICE DUE DATE: | INVOICE AMOUNT: ← 510 |
| 512 → PRODUCT TYPE: |
| 514 → INVOICE NOTES: |

PAYMENT RECEIPT 538

| 532 → PAYMENT ID: | PAYMENT DATE: ← 534 |
| 536 → CUSTOMER ID: | INVOICE ID: | PAYMENT AMOUNT: ← 540 |
| 542 → PAYMENT METHOD: |
| 544 → PAYMENT NOTES: |

METHODS AND SYSTEMS FOR ASSESSING PERFORMANCE AND RISK IN FINANCING SUPPLY CHAIN

TECHNICAL FIELD

The present disclosure generally relates to business and, more particularly to methods and systems for assessing performance and risk in financing supply chain.

BACKGROUND

Modern markets are filled with financial risks of investing/lending to business institutions. Financial risk is a certain amount of uncertainty that someone is willing to accept while making a financial decision. A risk value of a business institution indicates financial risk associated with the business institution. The risk value is a parameter determining credibility for engaging in investment and/or lending operations with the business institution.

Traditionally, business institutions mail supporting documents for collateral to the lending institutions. The supporting documents are scrutinized and validated at the lending institution to determine a risk value associated with the business institution. However, such methods require the lending institutions to study the supporting documents, validate claim for the collateral and evaluate the risk value, leading to a time consuming and cumbersome process. Further, credit analysts of the lending institutions review documents manually without assistance from a systematic machine learning risk model that complicates the entire process of determining risks in the financing supply chain.

Although, many techniques and methods have been proposed for determining the risk value associated with the business institution in an automated manner, such techniques are partly manual, inaccurate and slow in decision process. The credit bureau reports of the business institution are not updated frequently. Therefore, the risk value determined based on such credit bureau reports is inaccurate as they are based on outdated data. Further, risk value determined from credit ratings rely on the financial health of a company, and it does not account for factors like client-company relationships, quality of collateral for acquiring loan and predictive data of the business institution such as sales growth and social media reputation. Moreover, supply chain performance factors are not used in traditional credit rating. For example, supply chain performance factors of collaterals such as purchase orders, inventory or invoices are not tracked and determined. Furthermore, payment stubs do not always have information relating to payment for a particular invoice. In such cases, lending institutions find it difficult to match payments to the invoice and establish if the payment for the invoice is completed promptly or not. Further, the lending institutions find it difficult to evaluate risk value associated with the business institutions that are newly established and have no prior historical data associated with the business institution.

In view of the above, there is a need for methods and systems that can provide accurate and reliable financial risks associated with business institutions utilizing an automated process for assessing performance and risk in financing supply chain.

SUMMARY

Various embodiments of the present disclosure provide methods and systems for assessing performance and risk in financing supply chain.

In an embodiment, a computer-implemented method is provided. The method includes accessing, by a processor, a behavioral data of an entity. The behavioral data comprises at least one of a primary data and a secondary data. The primary data associated with one or more assets of the entity comprises historical transaction data of the entity with one or more financial institutions. The secondary data accessed from an external system comprises at least a credit information and a business transactions information of the entity. The method also includes generating, by the processor, a unified model for the entity based on the behavioral data of the entity. Further, the method includes determining, by the processor, a credit rating for the one or more assets of the entity based on the unified model by performing at least predicting, by the processor, using one or more machine learning models a plurality of risk metrics based on the unified model and computing, by the processor, the credit rating for the entity based on the plurality of risk metrics and the confidence measure. Each risk metric associated with a risk score and a confidence measure.

In another embodiment, a system is provided. The system comprises a display module, a memory and a processor. The display module is configured to display at least one UI on a display screen of the system for receiving entity input related to one or more assets of an entity for receiving a credit rating based on the one or more assets of the entity. The memory is configured to store one or more machine learning models. The processor is configured to be in operative communication with the display module. The processor is configured to access a behavioral data of the entity. The behavioral data comprises at least one of a primary data and a secondary data. The primary data is associated with the one or more assets of the entity and comprises historical transaction data of the entity with one or more financial institutions. The secondary data is sourced (e.g., accessed) from an external system comprises at least a credit information and a business transactions information of the entity. The system is configured to discard entity information of the entity and generate a unified model based on the behavioral data of the entity. The unified model is associated with an identifier. The system is also configured to predict a plurality of risk metrics based on the unified model using the one or more machine learning models such that each risk metric associated with a risk score and a confidence measure. Further, the system is configured to provide the plurality of risk metrics associated with the one or more assets of the entity to a plurality of financial institutions. Furthermore, the system is configured to facilitate display of a pricing for the one or more assets of the entity on the display module, wherein the pricing is received from at least one financial institution of the plurality of financial institutions.

In yet another embodiment, an automated risk management system is provided. The automated risk management system comprises a data source module, a data fusion module, a risk engine and a risk score computation module. The data source module is configured to access at least one of a primary data and a secondary data. The primary data associated with one or more assets of an entity comprises historical transaction data of the entity with one or more financial institutions. The secondary data accessed from an external system comprises at least a business transaction information of the entity. The data fusion module is communicably coupled to the data source module and is configured to remove entity identity information from the primary data and the secondary data and generate a behavioral data for the entity based on the primary data and the secondary data. The behavioral data is associated with an identifier for identifying the entity. The risk engine is configured to generate a unified model for the entity based on the behavioral data. The risk score computation module is configured to compute a credit rating for the one or more assets of the entity by predicting a plurality of risk metrics based on the unified model. Each risk metric is associated with the risk score.

Other aspects and example embodiments are provided in the drawings and the detailed description that follows.

BRIEF DESCRIPTION OF THE FIGURES

For a more complete understanding of example embodiments of the present disclosure, reference is now made to the following descriptions taken in connection with the accompanying drawings in which:

FIG. 5A illustrates a schematic representation of an invoice, in accordance with an example embodiment;

FIG. 5B illustrates a schematic representation of a payment receipt, in accordance with an example embodiment;

Figure 1:
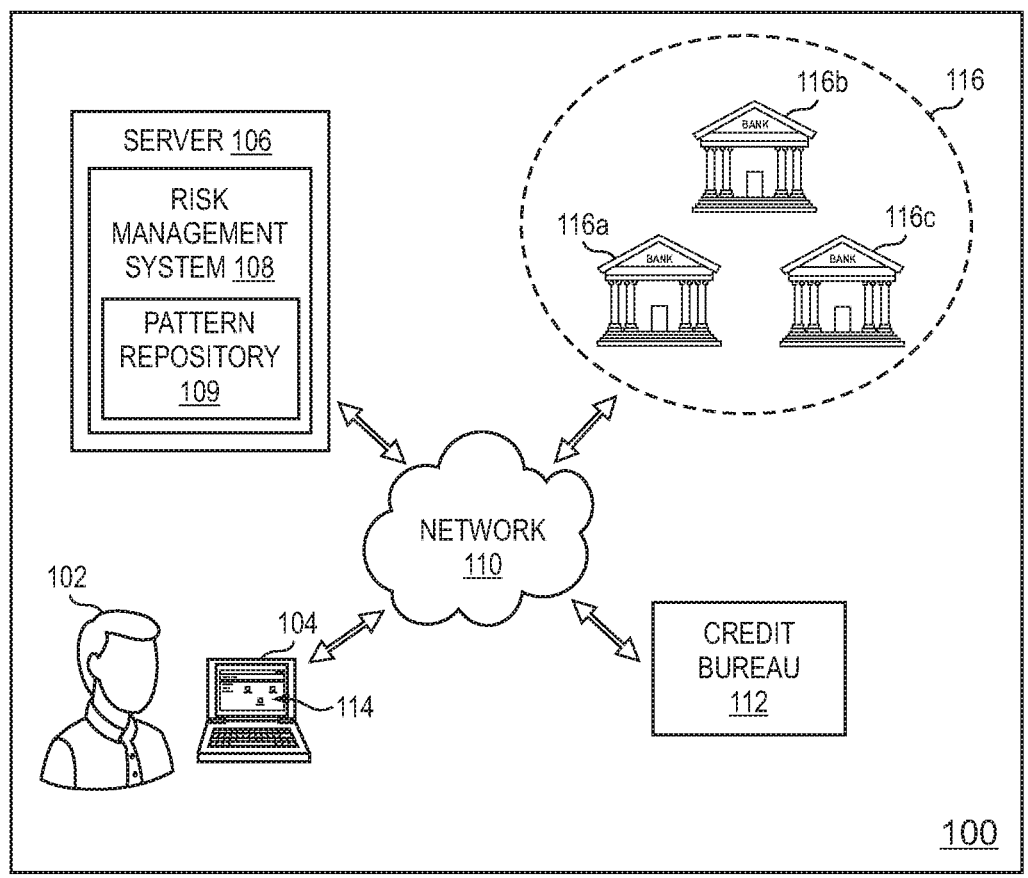
FIG. 1 illustrates an environment, where at least some embodiments of the present disclosure may be practiced.

The drawings referred to in this description are not to be understood as being drawn to scale except if specifically noted, and such drawings are only exemplary in nature.

DETAILED DESCRIPTION

Various methods, systems and computer readable mediums for assessing performance and risk in financing supply chain are disclosed.

In the following description, for purposes of explanation, numerous specific details are set forth in order to provide a thorough understanding of the present disclosure. It will be apparent, however, to one skilled in the art that the present disclosure can be practiced without these specific details. In other instances, systems and methods are shown in block diagram form only in order to avoid obscuring the present disclosure.

Reference in this specification to "one embodiment" or "an embodiment" means that a particular feature, structure, or characteristic described in connection with the embodiment is included in at least one embodiment of the present disclosure. The appearance of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

Moreover, although the following description contains many specifics for the purposes of illustration, anyone skilled in the art will appreciate that many variations and/or alterations to said details are within the scope of the present disclosure. Similarly, although many of the features of the present disclosure are described in terms of each other, or in conjunction with each other, one skilled in the art will appreciate that many of these features can be provided independently of other features. Accordingly, this description of the present disclosure is set forth without any loss of generality to, and without imposing limitations upon, the present disclosure.

Overview

In many example scenarios, an entity such as, a business institution requiring credit furnishes supporting documents for one or more assets against which they require a loan pricing to a financial institution. It is noted that the terms 'borrower', 'user' and 'entity' are used interchangeably throughout the description and refer to an individual or a business entity that request financing against any unconfirmed asset. The credit analysts in the financial institution study and validate the supporting documents manually to determine one or more risk metrics associated with the entity. In addition, manual validation of the supporting documents and determination of risk metrics is time consuming and tedious. Furthermore, automated risk computation techniques access credit bureau reports that are mostly outdated and provide an incomplete picture of risk associated with financing the entity. As the risk value associated with the entity has to be accurate and reliable for the financial institution, assessing performance and risk in financing supply chain for the entity has to include much more transaction and historical data mined from multiple data sources for a more better prediction.

Accordingly, various embodiments of the present disclosure provide methods, systems, electronic devices and computer program products for assessing performance and risk in financing supply chain. More specifically, techniques disclosed herein enable automatic validation and determination of a credit rating for the entity requesting collateral against one or more assets associated with the entity. As the credit rating is automatically determined for the entity, credit analysts in the financial institution are spared with the hassle of manually scrutinizing and validating supporting documents provided by the entity for acquiring the collateral. Moreover, the credit rating of the entity is automatically shared with one or more financial institutions and a loan pricing for the one or more assets associated with the entity are obtained from at least one financial institution, which otherwise could have resulted in the entity approaching multiple financial institutions requesting collateral against the one or more assets associated with the entity. It is noted that the terms 'lending institution', 'financing institution' are used interchangeable throughout the description and refer to an organization or establishment dealing with financial transactions, such as investments, loans and deposits, such as banks, trust companies, insurance companies and investment dealers.

In one embodiment, a server system provides an application, referred to herein as a risk management application. The risk management application is configured to assess performance and risk in financing supply chain of the entity. The term 'assessing performance' as used throughout the specification implies determining a credit rating for the entity based on the one or more assets furnished by the entity and historical data associated with the entity. The credit rating is determined from multiple sources of data associated with the entity that provides more accurate risk metrics involved in financing the entity, thereby providing a platform for financial institutions to screen and monitor entities requesting financing. In addition, the credit rating provides a platform wherein a financial institution can avoid financing a high-risk entity or can optionally provide a risk based pricing for the entity where the entity with high risk score is provided a loan pricing at a high interest rate.

In an embodiment, the risk management application facilitates display of one or more user interfaces (UIs) for receiving a primary data related to one or more assets from the entity for determining the credit rating associated with the entity. The primary data comprises historical transaction data of the entity with one or more financial institutions. For example, the entity may upload invoice documents (invoice #451, invoice #123) associated with the assets depicting transaction data of the entity against which the entity requests for financing. The server system accesses a secondary data from an external system such as, a credit bureau that gathers credit information and business transaction information of a plurality of entities. The secondary data is not limited to the credit information acquired from a plurality of financial institutions but also includes business transaction information, such as, social media reputation. Social media data is used to forecast sales growth, scanned documents and the like.

In an embodiment, entity information such as, personal identification information is removed from the primary information and the secondary information. In an example scenario, an anonymization algorithm is employed to capture essence of behavior of the entity after removing information such as, address, contact number of the entity. In an embodiment, the primary information and the secondary information are fused together to generate a behavioral data for the entity using the anonymization algorithm. The behavioral data is assigned with an identifier that identifies the entity based on the behavioral data.

In an embodiment, the server system generates a unified model for the entity based on the behavioral data of the entity using one or more machine learning algorithms. The unified model is stored in a pattern repository along with the identifier. In some example scenarios, assessing performance of the entity requesting collateral against the one or more assets is challenging when secondary information of the entity is not available. For example, if the entity is a new business institution (e.g., a startup), the volume of secondary information (historical data) available for analysis to determine credit rating may be limited. In such cases, behavioral data may be generated based on the primary data and the secondary data available. In addition, a plurality of similarity measures is determined for the entity by comparing the behavioral data of the entity with a plurality of unified models in the pattern repository. It shall be noted that each unified model is associated with a behavioral data of an entity of a plurality of entities.

In an embodiment, the server system identifies at least one unified model from the pattern repository that matches the behavioral data of the entity. The at least one unified model is determined based on the similarity measure. For example, a look-alike modeling approach is adopted by the server system wherein the unified model with a similarity measure closely matching the behavioral data of the entity is identified from the plurality of unified models. The unified model that closely resembles the behavioral data of the entity is selected to indicate the unified model of the entity and the credit rating is determined based on the selected unified model. In an embodiment, the server system may optionally fuse the behavioral data of the entity along with existing behavioral data that closely matches the behavioral data of the entity to generate a new unified model depicting the behavior of the new entity.

In an embodiment, the server system predicts a plurality of risk metrics based on the unified model using one or more machine learning models. In an example scenario, risk metrics such as a non-payment risk, a late payment risk, a dilution risk, a dispute risk, a fraud risk, a delivery risk and a shipment quality risk are determined for the entity based on the unified model. Accordingly, each risk metric is associated with a risk score and a confidence measure. For instance, the performance of the entity is assessed based on the risk metrics, for example, non-payment risk of 80% (high risk), late payment risk of 10% (low risk), dilution risk of 10% (low risk) and fraud risk of 90%, etc. In an embodiment, the credit rating is computed for the entity based on the plurality of risk metrics and the confidence measure. In an example scenario, the plurality of risk metrics are combined together using a weighing factor, such as a cost associated with the risk metric. For instance, each risk metric may be associated with a different cost, such as, a dilution risk carries a cost of 0.2 than late payment by a couple days (late payment risk) associated with a cost of 0.4. It shall be noted that the cost associated with each metric may be a pre-set value provided by a financial institution offering loan pricing or may be factory-installed, or may have fixed value for all for determining credit ratings. Accordingly, the credit rating is a single unified risk score that can be used for decision-making by the financial institution offering a pricing for the one or more assets furnished by the entity.

In an illustrative example, an entity (e.g., a Business Inc.) provides documents (e.g., invoice #1, invoice #2, and payment order #1) related to assets (asset 1, asset 2) against which a loan pricing is required via the risk management application. The server system extracts transactional data from the documents (invoice #1, invoice #2, and payment order #1) and stores them as primary data of the entity (Business Inc.). Further, the server system accesses the external system such as, a credit bureau or taps into social networking media to determine the secondary data of the entity (Business Inc.), such as, credit information, buyer-seller relationship, social media reputation, sales growth for current financial year, year of incorporation, number of employees, payment for employees and business transactional data. The primary data and the secondary data are fused together to generate behavioral data of the entity using an anonymization algorithm. The anonymization algorithm removes any personal identifiable information such as to preserve only the essence of behavior of the entity and assigns an identifier (AB #001) to track the entity (Business Inc.). The behavioral data of the entity (Business Inc.) is used to generate a unified model for the entity using one or more machine learning models.

If the behavioral data had been generated using substantial or no secondary information, then the behavioral data comprising the primary data and the secondary data of the entity (Business Inc.) are compared with a plurality of behavioral model (M1, M2, . . . , Mn) in a pattern repository to determine a plurality of similarity measures, wherein each similarity measure is associated with a behavioral model of an entity of the plurality of entities (E1, E2, . . . , En). The behavioral data of the entity (e.g., E2) that closely matches with the behavioral data of the entity (Business Inc.) has the highest similarity measure and the unified model (M2) corresponding to the entity is selected to represent the entity (Business Inc.). The performance of the entity (Business Inc.) is assessed to determine a risk in the financing supply chain of the entity based on a credit rating determined for the unified model of the entity (Business Inc.). For example, the credit rating is evaluated based on the behavioral data of entity on various risk metrics such as, dispute risk, non-payment risk, late payment risk, fraud risk, etc., The risk metrics are combined together based on a cost associated with each of the risk metric to generate the credit rating for the entity (Business Inc.).

The performance assessment for determining the risk in the financing supply chain of the entity is further explained in detail with reference to FIGS. 1 to 11.

FIG. 1 shows an example representation of an environment 100, where at least some embodiments of the present disclosure can be implemented.

The environment 100 depicts an individual, referred to hereinafter as a user 102, for illustration purposes. Each user is depicted to be associated with an electronic device. For example, the user 102 is depicted to be associated with an electronic device 104. The electronic device 104 is exemplarily depicted as a laptop. It is understood that the electronic device 104 of the user 102, may be embodied in various forms, such as a tablet computer, a wearable device, a personal digital assistant, a personal computer, and the like.

In an example scenario, the user 102 may be a person (individual) or an agent associated with a business entity. More specifically, the user 102 is an entity furnishing details of one or more assets against which the user 102 requires a loan pricing for acquiring credit. The user 102 may utilize the electronic device 104 to provide the details of the one or more assets to a server 106 using a communication network, such as a network 110. The network 110 may include wired networks, wireless networks and combinations thereof. Some examples of the wired networks may include, but are not limited to, the Ethernet, Local Area Network (LAN), fiber channel network, Wide Area Network (WAN), and the like. Some examples of the wireless networks may include, but are not limited to, cellular networks, Wi-Fi networks, and the like. An example of a combination of wired and wireless networks includes the Internet.

In an at least one example embodiment, the user 102 accesses a web portal or a financial risk interface 114 (hereinafter referred to as an application interface 114) via the electronic device 104. In some embodiments, the server 106 may provide an instance of the application interface 114 and users, such as the user 102, may download and install the application interface 114 in the electronic device 104 from the server 106. In some embodiments, a risk management system 108 may be disposed within the server 106, and the user 102 may provide a request to the risk management system 108 within the server 106 to download and install the application interface 114 therefrom.

Figure 7A:
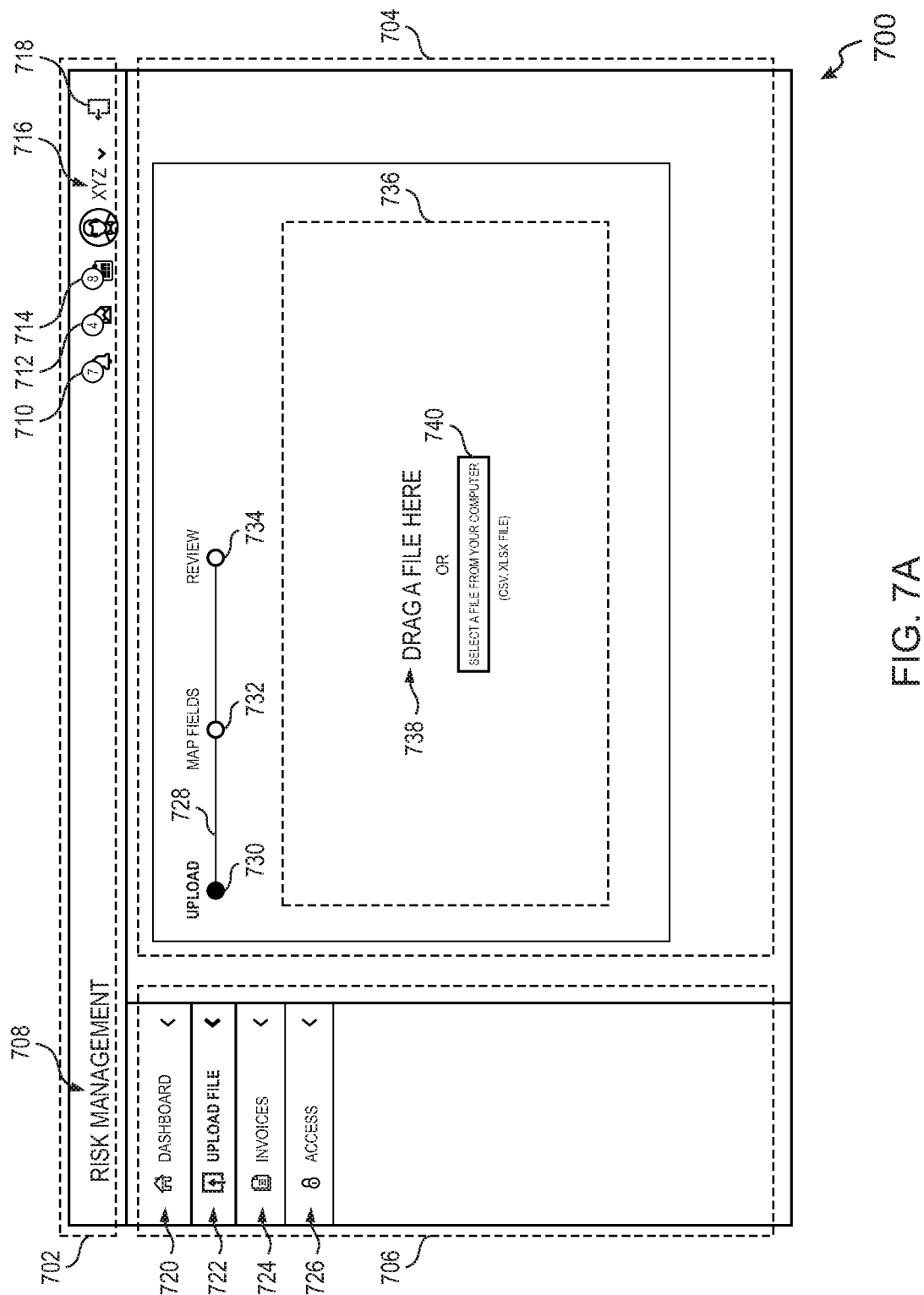
FIG. 7A illustrates an example representation of a UI displayed to a user on a display screen of an electronic device by an application interface for receiving documents related to one or more assets for determining a credit rating, in accordance with an example embodiment.
Figure 7B:
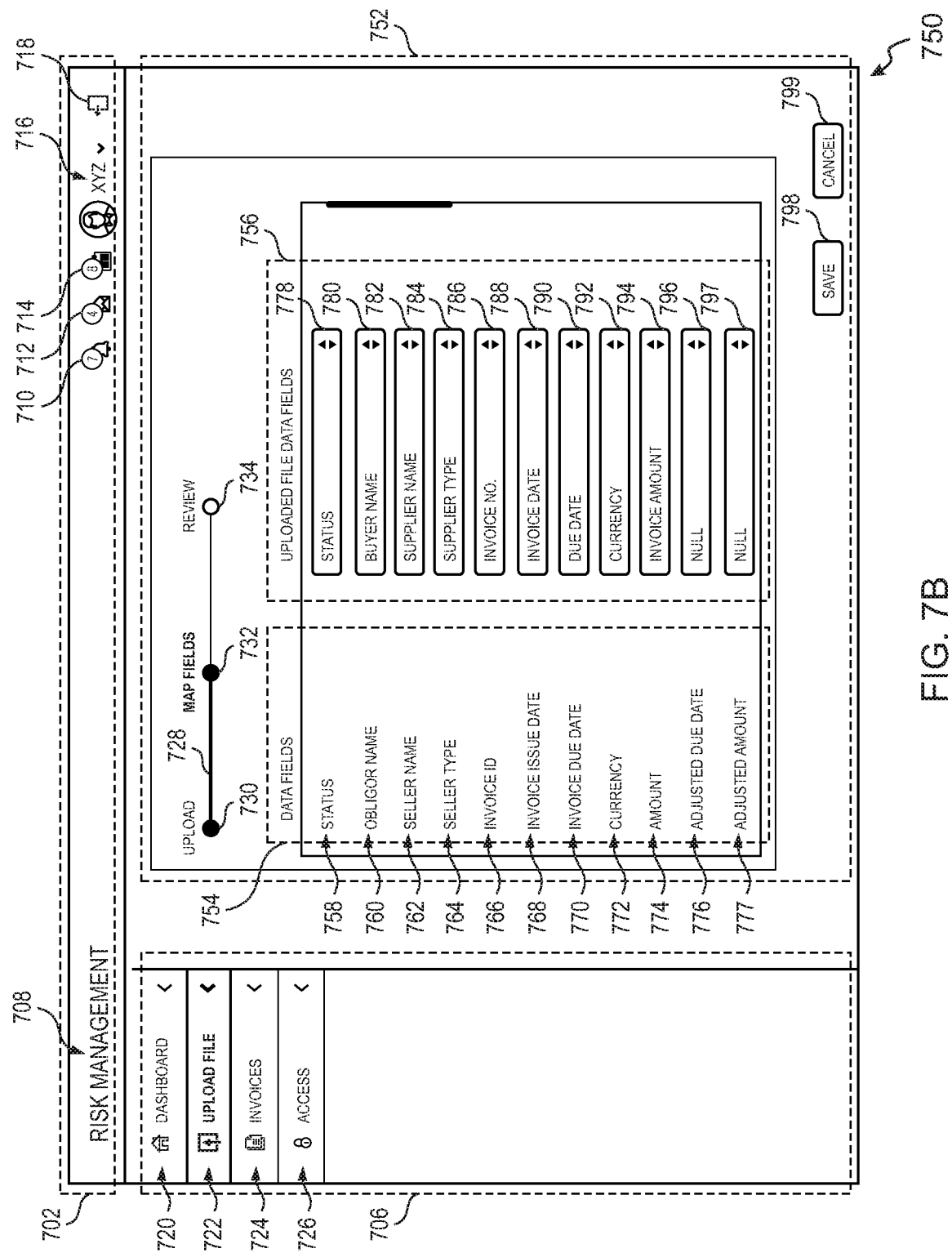
FIG. 7B illustrates an example representation of a UI displayed to a user on a display screen of an electronic device by an application interface for receiving primary information, in accordance with an example embodiment.

The application interface 114 causes display of one or more user interfaces (UIs) for receiving primary data pertaining to the one or more assets against which the user 102 intends to receive financing, such as, history on payment of invoices, past purchase orders and shipment history for obtaining collateral. For example, the user 102 may upload documents (invoice #1, invoice #2, purchase order #1) related to assets of the entity. Optionally, the application interface 114 also displays recent set of invoices and purchase orders, and the user 102 can select one or more documents (invoices/purchase orders) indicating transaction data of the user 102 against which financing is required. Example UIs displayed to the user 102 for provisioning the primary data related to the one or more assets for acquiring a credit rating are shown in FIGS. 7A and 7B.

Figure 11:
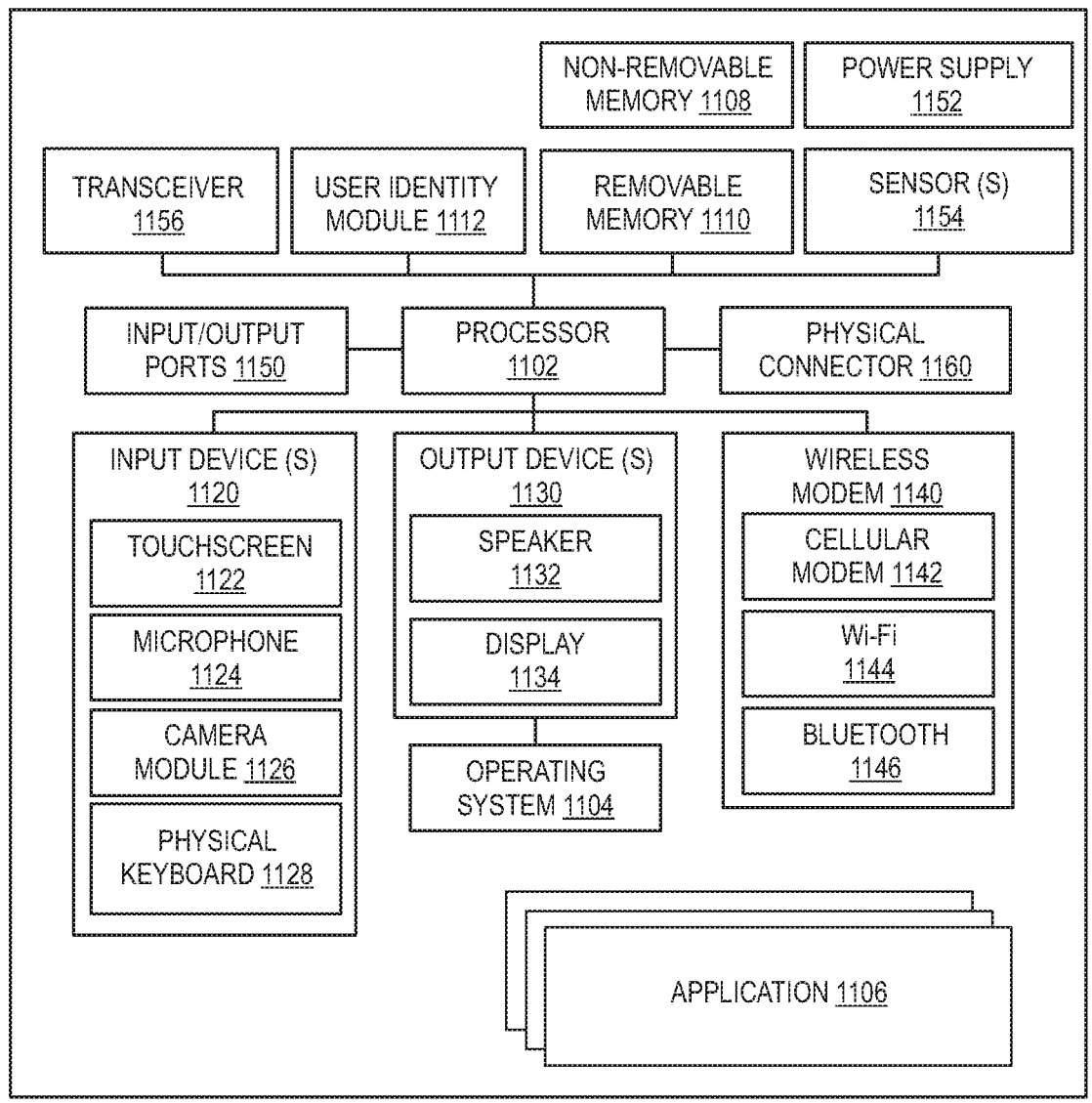
FIG. 11 shows simplified block diagram of a mobile device, in accordance with an example embodiment of the invention.

It is noted that the instructions (or the executable code) configuring the application interface 114 are stored in the memory of the electronic device 104 after installation, and the instructions are executed by a processor (for example, a single-core or a multi-core processor) included within the electronic device 104, as is exemplarily shown with reference to FIG. 11. Accordingly, even though the various functionalities for assessing performance of the entity are explained with reference to or being performed by the application interface 114, it is understood that the processor in conjunction with the code in the memory is configured to execute the various tasks as enabled by the instructions of the application interface 114.

In an example scenario, a risk associated with financing the user 102 based on the one or more assets is determined by a risk management system, such as, the risk management system 108 disposed within the server 106. The risk management system 108 is configured to receive the primary data from the application interface 114. The primary data comprises historical transaction data of the user 102 with one or more financial institutions 116a, 116b, and 116c (hereinafter referred to as a 'financial institution 116). For example, the user 102 may upload invoice documents (invoice #451, invoice #123) associated with the assets depicting transaction data of the user 102 against which the user 102 requests for financing. Accordingly, the risk management system 108 accesses primary information and/or secondary information from the financial institutions 116 to determine historical data associated with the user 102 for assessing performance of the assets furnished by the user 102 and determining a financial risk involved in financing the user 102.

In some example embodiments, the risk management system 108 sources (e.g., accesses) a secondary data from an external system such as, a credit bureau 112 that gathers credit information and business transaction information of a plurality of users. The credit bureau 112 represents an establishment/organization that collects credit information from the financial institutions 116 and/or data furnishers (e.g., third party service) providing the secondary information from alternate data sources associated with the plurality of users. It shall be noted that the secondary data is not limited to the credit information acquired from the credit bureau 112 but also includes business transaction information, such as, buyer-seller relationship, social media reputation, social media data used to forecast sales growth, scanned documents and the like. In some embodiments, the risk management system 108 may tap into social media data of the user 102 for determining the secondary information from the data furnishers. Alternatively, the credit bureau 112 may access data sources such as, creditors, lenders, marketing agencies, utilities, debt collection agencies, consumers, sellers and court records for acquiring the secondary information associated with the plurality of users. The credit bureau 112 aggregates the information accessed from the data sources and the financial institutions 116 corresponding to the plurality of users into a data repository. The credit bureau 112 provides the secondary information when a user request is provided by the risk management system 108 for performing a credit risk assessment and determining the credit rating of the user 102. It shall be noted that the operations of the risk management system 108 may also be embodied in any electronic device such as, the electronic device 104.

The risk management system 108 may be configured to remove user specific information such as, personal identification information from the primary information and the secondary information of the user 102. In an example scenario, an anonymization algorithm is employed to capture essence of behavior of the user 102 after removing information such as address, contact number of the entity. In an embodiment, the primary information and the secondary information are fused together to generate a behavioral data for the user 102 using the anonymization algorithm. Accordingly, the behavioral data of the user 102 is assigned an identifier for identifying the user 102 based on the behavioral data.

In an embodiment, the risk management system 108 is configured to generate a unified model for the user 102 based on the behavioral data of the user 102 using one or more machine learning models. The unified model is stored in a pattern repository 109 along with the identifier. Accordingly, the pattern repository 109 comprises a plurality of unified models wherein each unified model is associated with behavioral data of the user 102.

In some example scenarios, assessing performance of the user 102, requesting collateral against the one or more assets, is challenging when secondary information of the user 102 is either not available or insufficient. For example, if the user 102 is a startup, the volume of secondary information (historical data), available for analysis to determine credit rating, may be limited. In such cases, behavioral data may be generated based on the primary data and the secondary data available for the user 102. In addition, the risk management system 108 is configured to compare the behavioral data of the user 102 (generated based on limited availability of primary information and/or secondary information) with the plurality of unified models in the pattern repository 109 to determine a plurality of similarity measures. It shall be noted that each unified model is associated with a behavioral data of a user of a plurality of users.

In at least one example embodiment, the risk management system 108 identifies at least one unified model from the pattern repository 109 that matches the behavioral data of the user 102. The at least one unified model is determined based on the similarity measure. The unified model that closely resembles the behavioral data of the user 102 is selected to indicate the unified model of the user 102 and the credit rating is determined based on the selected unified model.

In some example embodiments, the risk management system 108 predicts a plurality of risk metrics based on the unified model using one or more machine learning models. In an example scenario, risk metrics such as a non-payment risk, a late payment risk, a dilution risk, a dispute risk, a fraud risk, a delivery risk and a shipment quality risk are determined for the entity based on the unified model. Accordingly, each risk metric is associated with a risk score and a confidence measure.

In an example scenario, the plurality of risk metrics are combined together using a weighing factor, such as a cost associated with the risk metric. For instance, each risk metric may be associated with a different cost, such as, a dilution risk carries a cost of 0.2, and a late payment by a couple days (late payment risk) is associated with a cost of 0.4. It shall be noted that the cost associated with each metric may be a pre-set value provided by a financial institution offering loan pricing or may be factory-installed, or may have fixed value for all for determining credit ratings. Accordingly, the credit rating is a single unified risk score that can be used for decision-making by the financial institution offering a pricing for the one or more assets furnished by the entity.

The environment 100 includes the server 106 configured to host and manage the application interface 114 and communicates with user devices, such as the electronic device 104 to provide an instance of the application interface 114. The server 106 may be located at one place or may be distributed at multiple locations. Accordingly, the application interface 114 may be an application resting at the server 106 in form of a web application or a mobile application. The mobile application may be available for download on Google® playstore, Apple® app store, etc. The instances of the application interface 114 can be made available at the user devices, such as the electronic device 104.

Some example embodiments of the risk management system 108 are explained with reference to FIG. 2.

Figure 2:
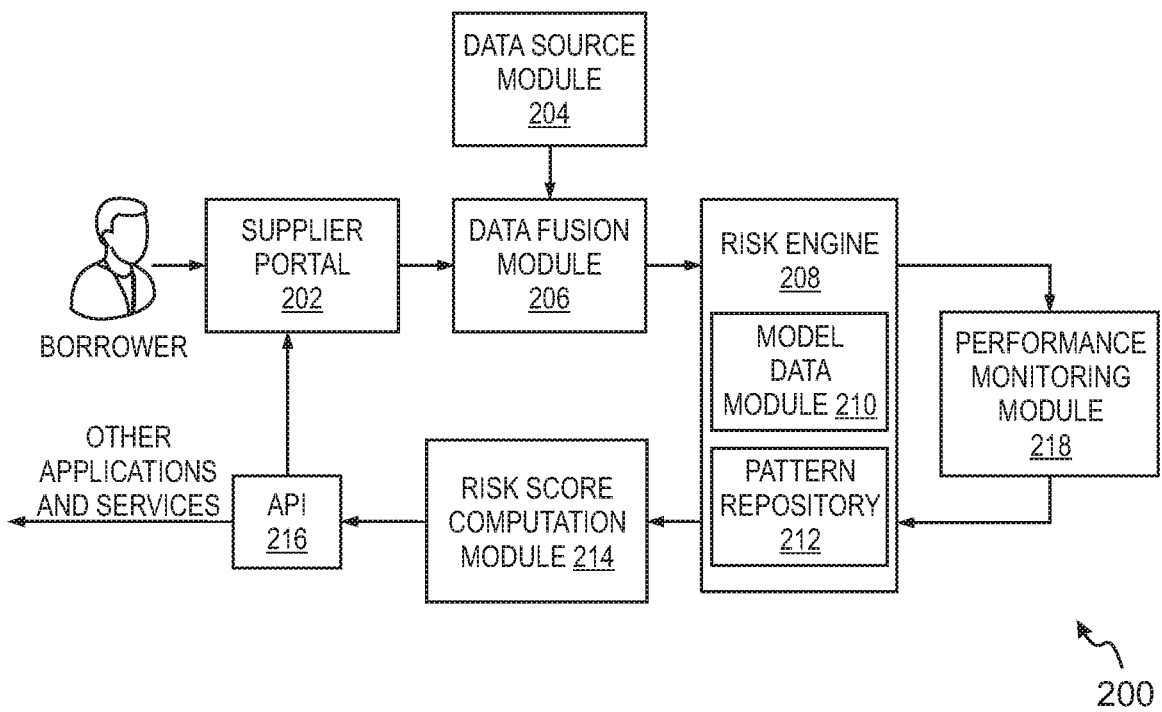
FIG. 2 illustrates a block diagram of a risk computing system for determining risk in financing supply chain, in accordance with an example embodiment.

Referring now to FIG. 2, a block diagram depicting a risk management system 200 for determining risk in financial supply chain, for example, risk in lending to an entity (e.g., a user or a business institution) is illustrated in accordance with an example embodiment. The operations of the system 200 can be embodied in the server 106, or can be embodied in form of one or more distributed elements accessible to the server 106.

The system 200 includes a supplier portal 202, a data source module 204, a data fusion module 206, a risk engine 208, a risk score computation module 214 and an Application Programming Interface (API) 216. The supplier portal 202 is accessed by an entity (hereinafter referred to as 'borrower'), such as the user 102 for uploading supporting documents to acquire collateral. The supporting documents are transaction data including but not limited to past history on payment of invoices, past purchase orders and shipment history. In an embodiment, the borrower can select one or more documents from the supporting documents displayed on the supplier portal 202. In an example, the borrower (e.g., Blue Inc.) exports invoices such as, invoice #1, invoice #2, . . . , invoice #n and purchase orders PO #1, PO #2, . . . , PO #n to the supplier portal 202. Accordingly, the borrower can select one or more invoices, for example, invoice #2, invoice #5, invoice #6 and purchase orders, PO #1, PO #3, against which the borrower intends to receive financing. The selected invoices and purchase orders are termed as unconfirmed assets and data extracted from the supporting documents constitute primary data of the borrower. The supplier portal 202 is an example of the application interface 114 explained with reference to FIG. 1.

The data source module 204 provides secondary information, such as, credit information and business transaction information acquired from alternate data sources that are not traditionally used by banks and funders to detect risk factors. For example, the data source module 204 acquires social media reputation of businesses by tapping into a variety of sources such as Facebook®, Twitter™, Weibo®, Google®, Amazon®, Instagram™ and the like. Some examples of the secondary data include, but are not limited to, natural language processing techniques applied on scanned invoices and purchase orders, shipment information, social media reputation of businesses, using social media data to forecast sales growth, buyer-seller relationship, historical data associated with buyer, a size of the business establishment, years since incorporation of the business establishment, estimated invoice volume, estimated purchase volume, historical and projected profit of the business, top historical vendors, top historical suppliers and business owners' payment data (to vendors, cell phone bills/utilities, office lease/rent, etc.).

The data source module 204 also acquires transaction level data that better captures company-to-client relationships, transaction anomalies and risks specific to the transaction such as product being produced, manufactured, shipped, shipment risks and inventory supply/demand risks. For instance, buyer-seller relationship is determined based on historical volume of transactions between the buyer and the seller. For example, a relationship score between the buyer and the seller is computed based on how different buyers and sellers are connected to each other by determining whether the buyers and sellers have transacted with each other before and other characteristics that link the buyers and the sellers such as common industry, large overlapping set of vendors, large overlapping set of suppliers and the like. The data source module 204 may be an external system, such as, an organization or establishment providing credit information of the borrower based on a plurality of information. An example of the data source module 204 may be the credit bureau 112 shown and explained with reference to FIG. 1.

The data fusion module 206 is coupled to the supplier portal 202 and the data source module 204, and is configured to receive the primary data and the secondary data from the supplier portal 202 and the data source module 204, respectively. The data fusion module 206 is configured to fuse the primary data and the secondary data for generating a behavioral data of the borrower. In addition, the data fusion module 206 is configured to implement an anonymization algorithm that captures essence of behavior of the borrower (e.g., the user 102) to generate behavioral data (of the borrower) rather than personal identifying information about the entity (borrower). The anonymization algorithm assigns an anonymized ID to the behavioral data. For example, the anonymization algorithm removes any Personal Identifiable Information (PI) from the behavioral data (borrower data), such as, address, contact information of the borrower and tracks the borrower with an internal system anonymized ID.

The risk engine 208 performs risk assessment for the borrower based on the behavioral data associated with the borrower. The risk engine 208 includes a model data module 210 and a pattern repository 212. The model data module 210 ingests behavioral data from the data fusion model 206 to generate a borrower model (also referred to as 'a unified model') corresponding to the behavioral data of the borrower. The borrower model is based on the primary data and the secondary data. In an example, the borrower model captures behavior of the borrower from the unconfirmed assets (e.g., invoices, purchase orders and inventory) provided by the borrower in the supplier portal 202 and the secondary data obtained from the data source model 204. The borrower model can be modeled using statistical modeling techniques such as Gaussian mixture model or using neural networks. Further, the anonymized ID generated by the data fusion module 206 ensures that no sensitive data such as PII are used when the primary data and the secondary data are fused to generate the unified model in the model data module 210.

The unified model generated by the model data module 210 is stored in the pattern repository 212. The pattern repository 212 is configured to store a plurality of unified models corresponding to a plurality of users. In some example embodiments, the pattern repository 212 receives and stores information about a plurality of borrowers from one or more financial institutions such as the financial institutions 116 (shown in FIG. 1) in a lookup table. For instance, credit information of a plurality of borrowers are obtained from different banks and fused in a privacy preserving way (e.g., excluding PII of the borrowers). The credit information corresponding to the plurality of borrowers is used to help in learning more patterns that indicates risk within the unified model generated by the model data module 210. For instance, the credit information of a borrower 'borrower 1' may include, but is not limited to, total amount of loan, assets disclosed for acquiring loan, interest rate of the loan, total installments paid by the borrower 'borrower 1', missed installments (if any), late payment, total due and additional fine (if any). In an embodiment, the credit information is used to generate a borrower model and stored in the pattern repository 212 depicting behavior of a corresponding user.

Alternatively, a look-alike modeling is performed when a new business institution requests for financing against unconfirmed assets. For example, if the borrower is a new business institution (e.g., a startup), the volume of secondary information (historical data) available for analysis to determine credit rating may be limited. In such cases, the look-alike modeling is adopted that uses borrower information (of a business institution) such as, size of business institution, years since incorporation, estimated invoice volume, estimated purchase volume, historical and projected profits, top historical vendors, top historical suppliers, and other factors related to business transactions of the business institution along with the primary information furnished by the borrower in the supplier portal 202. The borrower information along with the primary information (furnished by the borrower in the supplier portal 202) corresponding to the new business institution is compared with the plurality of borrower models in the look up table and/or the pattern repository 212 using various look-alike and similarity measures such as jaccard and cosine to determine a set of look-alike borrowers in real-time. In some example embodiments, a plurality of similarity measures is determined for the borrower by comparing the behavioral data (or borrower information) of the borrower with a plurality of unified models in the pattern repository 212. It shall be noted that each unified model is associated with a behavioral data of a user of the plurality of users.

In an embodiment, at least one unified model is identified from the pattern repository 212 that matches the behavioral data (or the borrower information) of the borrower. The at least one unified model is determined based on the similarity measure. For example, the unified model with a similarity measure closely matching the behavioral data of the user 102 is identified from the plurality of unified models. The unified model that closely resembles the behavioral data of the user 102 is selected to indicate the unified model of the borrower and a credit rating is determined based on the selected unified model. In some embodiments, the borrower information of the borrower may optionally be fused with the behavioral data of selected unified model that closely matches the borrower information of the borrower to generate a new unified model depicting the behavior of the new entity. In at least one example embodiment, one or more look-alike borrowers (e.g., B1, B3, B5) may be determined based on the similarity measure and the behavioral data of the look-alike borrowers (e.g., B1, B3, B5) is used to generate the unified model corresponding to the new entity.

The risk score computation module 214 is coupled to the risk engine 208 and is configured to determine a credit rating based on a plurality of risk metrics. The plurality of risk metrics are determined based on the unified model generated by the risk engine 208. More specifically, the risk metrics are determined based on the primary data from the supplier portal 202 and the secondary data obtained from the data source module 204. The risk score computation module 214 generates the risk metrics in terms of a risk score and a confidence measure. Examples of the risk metrics include, but are not limited to, overall risk, non-payment risk, late payment risk, dilution risk, dispute risk, fraud risk, delivery and shipment quality risk. The risk score is computed for each risk metric as a numerical value ranging between 0 and 100 with 100 being the highest risk. Further, each risk metric is assigned a confidence measure of low, medium, high based on liability for the risk score. For example, if the borrower furnishes unconfirmed assets (Invoice #2, invoice #5, PO #1) for acquiring financing, the risk metrics are computed based on the unconfirmed assets, secondary information from alternate data sources and historical data of the borrower (acquired from other banks) available in the pattern repository 212 of the risk engine 208. In an example scenario, the risk score computation model 214 generates risk metrics as:

| | |
|---|---|
| Overall Risk: 90 | Confidence: High |
| Non-payment risk: 85 | Confidence: Medium |
| Late payment risk: 20 | Confidence: High |

The risk metrics indicate that the riskiness in providing financing to the borrower (e.g., the user 102) based on individual or collective assets (invoice #2, invoice #5, PO #1) provided by the borrower is high (e.g., the overall risk of 90 with a high confidence). It shall be noted that the overall risk is indicative of the credit rating for the borrower. The non-payment risk, if high (e.g., 85), indicates that the borrower might not be able to repay the loan. It must be noted that the risk metrics are computed based on the primary information and the secondary information associated with the borrower. However, risk metrics can also use information pertaining to historical data of the borrower acquired from the one or more banks to determine riskiness of lending to the borrower.

In an example scenario, the plurality of risk metrics are combined together using a weighing factor, such as a cost associated with the risk metric for determining the credit rating for the borrower. For instance, each risk metric may be associated with a different cost, such as, a non-payment risk carries a cost of 0.5 than late payment by a couple days (late payment risk) associated with a cost of 0.1. It shall be noted that the cost associated with each metric may be a pre-set value provided by a financial institution offering loan pricing or may be factory-installed, fixed value for all determining all credit ratings. Accordingly, the credit rating is a single unified risk score that can be used for decision-making by the financial institution offering a pricing for the one or more assets furnished by the borrower.

In an example scenario, the pattern repository 212 may include a plurality of unified models (M1, M2, . . . , Mn) related to the plurality of borrowers (B1, B2, . . . , Bn). The risk engine 208 may further be configured to compare a plurality of behavioral data (D1, D2, . . . , Dn) associated with the plurality of unified models (M1, M2, . . . , Mn) in the pattern repository 212 to compute a similarity measure (i.e. a relevancy score) of a entity (E1) with the plurality of behavioral data (D1, D2, . . . , Dn). Example methods of computing similarity measure include but not limited to cosine similarity, jaccard, kernel functions, Euclidean distance and the like. A similarity measure for a behavioral data (or unified model) above a pre-defined threshold, or more specifically, closely matching behavioral data of the entity (E1) may be computed as '100' when the behavioral data of the entity E1 and the model M2 match in all attributes. In an example, the entity E1 has attributes classified as a startup with marginal profits, employee strength of 10 dealing with hardware, predicted with 20% sales growth for current financial year and moderate customer satisfaction whereas model M2 corresponds to a startup entity E2 with attributes, such as, marginal profits, employee strength of 15 dealing with hardware service, predicted with 18% sales growth for current financial year and high customer satisfaction. Accordingly, the entity E1 and the model M2 have a high similarity measure, for example, '94' based on matching their individual attributes. In a similar way, a similarity measure for the entity E1 with the model M1 (i.e. a model corresponding to a well-established entity with high profits, employee strength of 1000 dealing with hardware, predicted with 20% sales growth for current financial year and high customer satisfaction) may be '10' as the behavioral data of the entity E1 and the model M1 do not match. It is noted that a simplified example for computing the similarity measure is explained herein for ease of understanding. It is noted that the risk engine 208 may employ complex algorithms capable of considering several other factors for determining the similarity measure.

The risk metrics with associated score values and confident measures are passed on to funders (lending institutions) via the Application Programming Interface (API) 216. The funders may be any prospective lender/lending organizations such as banks. The funders review the credit rating along with risk metrics and/or the associated score values, the confident measures to return a pricing if the lending institution/lender is willing to provide the loan for the unconfirmed asset/asset. For example, a financial institution 'Bank 1' observes the credit rating and/or risk metrics of the borrower (either asset specific or overall risk metrics) and agrees to provide financing against collateral specifying an interest rate of 15% and with a set of terms and agreements for the collateral. In an example scenario, loan pricing offered for the borrower with a poor credit rating (high-risk borrower) may be higher than average based on the credit rating and the risk involved in financing the borrower. The borrower is notified if any funder (lender/lending institution) approves borrower's loan request via the application interface 114. Information pertaining to the lender/lending institution and the pricing for the loan request is updated against the supporting documents provided by the borrower in the supplier portal 202.

Additionally or optionally, the risk computing system 200 includes a performance monitoring module 218 that is coupled to the risk engine 208. The performance monitoring module 218 is configured to monitor supply chain performance of the primary information such as, invoices, purchase orders, shipment history, social media reputation of the business institution based on the supporting documents uploaded by the borrower in the supplier portal 202 and the secondary information from the data source module 204. The supply chain performance of the invoices, purchase orders and the shipment history are used to update the risk engine 208. For instance, the performance monitoring module 218 can intercept the supply chain and produce risk scores at various stages. In general, the performance monitoring module 218 monitors the supply chain as more data is available for determining the credit rating and assesses risk metrics which improves the predictive accuracy. For example, at each point in the supply chain, the risk score calculation has information about the preceding steps, changes or edits to the order, problems, etc. For example, in the supply chain process, purchase order, shipment, goods receipt, invoice receipt, invoice approval, invoice payment, and the goods receipt will have information of purchase order and shipment. However, at start of the supply chain, there is risk of the purchase order not converting to an invoice, but after the goods are delivered and the invoice is approved, that risk vanishes, and the only risks remaining would be dilution, late days, etc. This ensures that the performance monitoring module 218 performs risk assessment after the purchase order is created, after shipment, after receipt of the products, after invoice is received, and after invoice approval.

Figure 3:
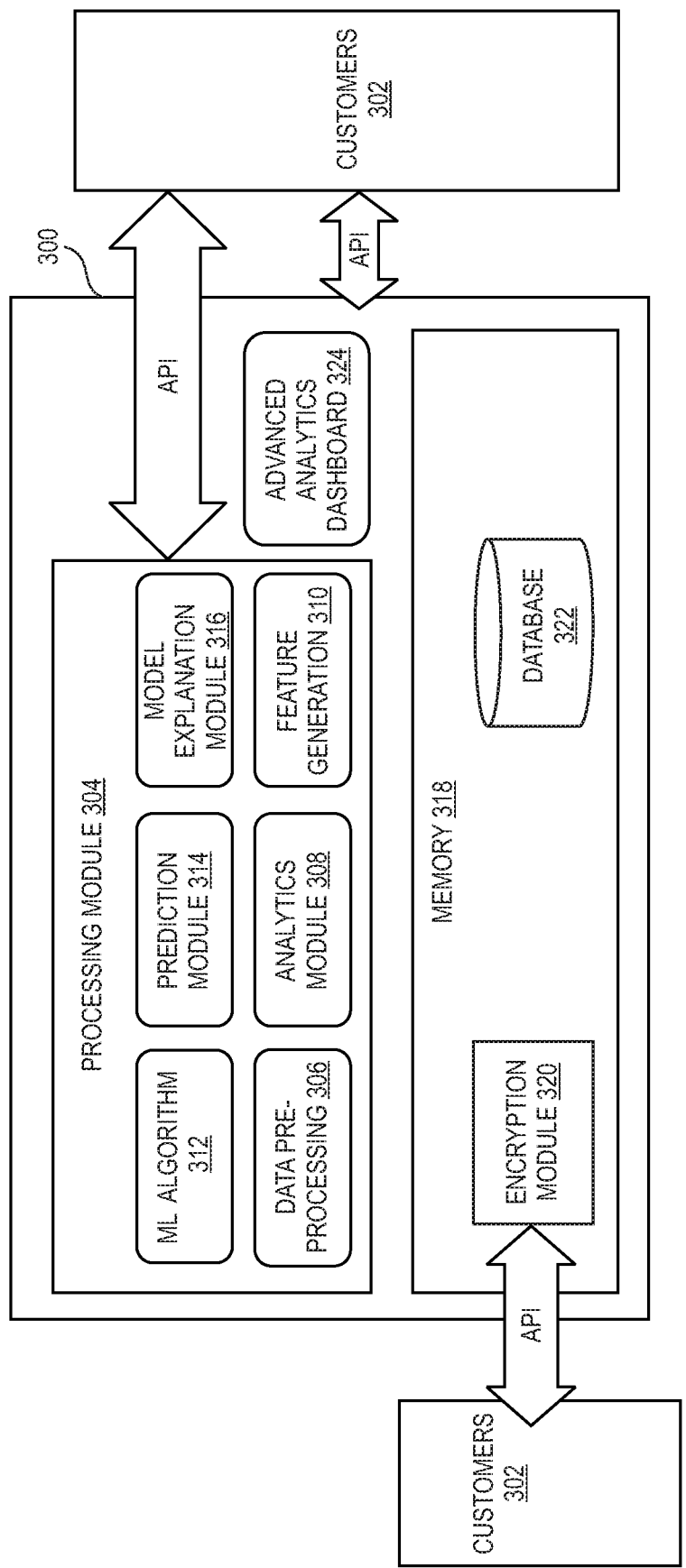
FIG. 3 illustrates a block diagram of a risk computing system for determining risk in financing supply chain, in accordance with another example embodiment.

Referring now to FIG. 3, a block diagram of a risk computing system 300 for determining risk in financial supply chain is illustrated in accordance with another example embodiment of the present invention. The operations of the system 300 can be embodied in the server 106, the electronic device 104 or a combination thereof.

In some example embodiments, a customer 302 provides documents related to one or more assets such as, scanned invoices, scanned payment orders and shipment history. The scanned invoices give us much of the information for each order such as, products, quantities, pricing, issue date, due dates, discounts and shipment addresses. Similarly, payment orders give us similar information, amount paid, date paid, any disputes. Such information is used both in its raw form, and to generate proprietary features from time series and historical corpus that constitute primary data. In some example embodiments, the primary data is provided by the customer 302 via an advanced analytics dashboard 324. The advanced analytics dashboard 324 may cause display of one or more UIs for acquiring primary data from the customer 302. The UIs are further explained in detail with reference to FIGS. 7A-7B and 8A-8B.

The system 300 includes a processing module 304 and a memory 318. The memory 318 includes an encryption module 320 and a database 322. The primary data acquired via the advanced analytics dashboard 324 is stored in the database 322. The encryption module 320 is configured to retrieve secondary information of the customer 302 such as, credit information from one or more financial institutions, business transaction information, such as, buyer-seller relationship, social media reputation, social media data for forecasting sales growth, scanned documents, and data accessed from data furnishers or data sources such as, creditors, lenders, marketing agencies, utilities, debt collection agencies, consumers, sellers and court records via an Application Programming Interface (API) gateway and encrypt the secondary information corresponding to the customer 302 before saving it in the database 322. It shall be noted that the primary data and the secondary data associated with the customer 302 may be stored at different locations and are mapped to the customer 302 in the processing module 304. In an example scenario, a S3 default encryption for S3 bucket is employed to encrypt the secondary data associated with the customer 302. The secondary data is decrypted when the processing module 304 requests for the secondary data associated with the customer 302. It shall be noted that the database 322 preserves unauthorized access of customer information by providing options for the customer 302 to define user access and permissions for accessing the primary data and the secondary data associated with the customer 302.

The processing module 304 includes a data pre-processing module 306, an analytics module 308, a feature generation module 310, a Machine Learning (ML) algorithm module 312, a prediction module 314 and a model explanation module 316. The data pre-processing module 306 is configured to pre-process the primary data and the secondary data corresponding to the customer 302. For example, the data pre-processing module 306 retrieves primary data such as invoice ID, invoice date, invoice amount from the database 322 and converts the primary data into a standard format such as, for example, currency conversion in the invoice amount.

The analytics module 308 is communicably coupled to the data pre-processing module 306 and is configured to accept the primary data and the secondary data in the standard format. In at least one example embodiment, the analytics module 308 is configured to perform mathematical computations to determine statistical data such as variance, Day Sales Outstanding (DSO) associated with the customer 302 based on the primary data and the secondary data. Optionally, the statistical data is stored in the database 322.

In at least one example embodiment, the feature generation module 310 is configured to extract one or more features from the statistical data that reflect a behavioral data associated with the customer 302. The feature generation module 310 ensures that essence of behavior of the customer 302 is captured other than personal identifying information such that the risk involved in financing can be predicted based on the behavioral data of the customer 302. The one or more features are provided to the ML algorithm module 312. The ML algorithm module 312 comprises one or more machine learning models that study a pattern/behavior of the customer 302 and create a unified model depicting the behavioral data of the customer 302.

The prediction module 314 is communicably coupled to the ML algorithm module 312 and is configured to make predictions based on the unified model. For example, the prediction module 314 predicts future behavior of the consumer 302 based on a pattern learnt from historical data (the primary data and the secondary data). In an example scenario, the prediction module 314 is configured to predict a plurality of risk metrics such as, a non-payment risk, a late payment risk, a dilution risk, a dispute risk, a fraud risk, a delivery risk and a shipment quality risk based on the pattern learnt from the behavioral data (or the unified model). Furthermore, the prediction module 314 is configured to compute a credit rating based on the plurality of risk metrics for the customer 302. For example, the plurality of risk metrics are combined together using a weighing factor, such as a cost associated with the risk metric. It shall be noted that the cost associated with each risk metric may be a pre-set value provided by a financial institution 116 offering loan pricing or may be factory-installed, fixed value for determining all credit ratings. Accordingly, the credit rating is a single unified risk score that can be used for decision-making by the financial institution 116 offering a pricing for the one or more assets furnished by the customer 302.

The model explanation module 316 is configured to provide explanations for the credit rating and the plurality of risk metrics. The model explanation module 316 employs one or more algorithms that are used to interpret the behavior model of the prediction algorithm. For each prediction of a risk score associated with a risk metric, the explanations algorithm will find key drivers that caused the prediction to take on the risk value computed. For example, the explanation algorithm uses all features and generates a local model to understand which factors are most influential in causing the particular risk score. Accordingly, a list of rank ordered reasons for the risk score based on important variables, along with whether they caused the risk score to go up or go down are displayed. In a non-limiting example, the model explanation module 316 may display a text depicting confidence measure associated with each risk metric of the plurality of risk metrics. For example, a non-payment risk of 90% is displayed along with a confidence measure associated with text 'High'. The confidence measure indicates that the non-payment risk associated with the customer 302 is high. Optionally, the model explanation module 316 may provide a brief description indicating why the prediction module 314 predicted a risk score for a risk metric, for example, "late-payment risk is 90% is high as the customer 302 has paid late for creditors (Bank 1, Bank 2) by 200-250 days".

In some example embodiment, the prediction and prediction explanation are relied to the customer 302 and/or plurality of financial institutions via API 216 to the advanced analytics dashboard 324 or the application interface 114 associated with the customer 302.

The machine learning models learn pattern from features extracted to predict the plurality of risk metrics. An example of a machine learning model predicting based on primary data and secondary data is explained with reference to FIG. 4

Figure 4:
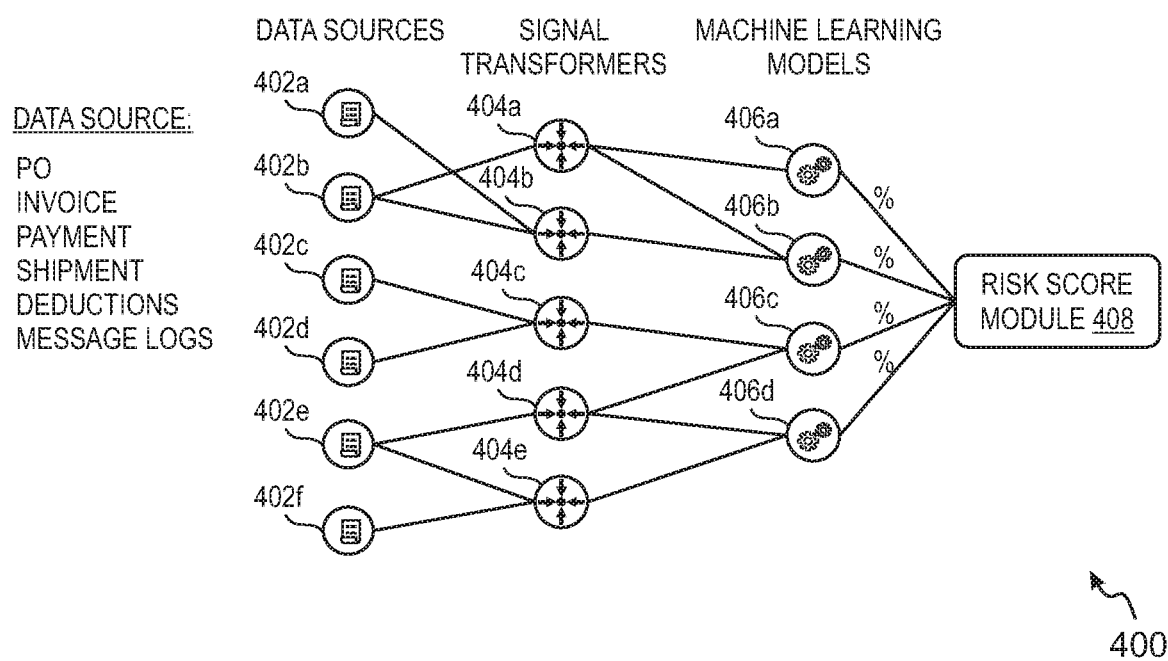
FIG. 4 illustrates a schematic representation of a machine learning pipeline for predicting credit rating from a plurality of data sources, in accordance with an example embodiment.

Referring now to FIG. 4, a schematic representation of a machine learning pipeline 400 for predicting credit rating (risk score) from a plurality of data sources 402a, 402b, 402c, 402d, 402e, 402f is illustrated in accordance with an example embodiment. The pipeline 400 may be embodied in any of the system 200, the system 300 or the risk management system 108.

The pipeline 400 is configured to ingest data from the plurality of data sources 402a, 402b, 402c, 402d, 402e, 402f. The data sources 402a, 402b, 402c, 402d, 402e, 402f correspond to borrower data (primary data and secondary data) of a customer (e.g., the user 102) accessed from a database, such as, the database 322. The primary data may be provided by the customer on the application interface 114 and the secondary data may be accessed from external system, such as, the credit bureau 112. The borrower data (also referred to as 'behavioral data') correspond to assets against which the borrower requires loan (financing). Examples of the data sources 402a, 402b, 402c, 402d, 402e, 402f include, but are not limited to, current invoices, current purchase orders, current inventory, shipment history and delivery to different vendors, historical invoices, historical payments, historical purchase orders, historical transactions, message logs, social media reputation, social media data to forecast sales growth and business owners' payment data, credit information from data sources such as, creditors, lenders, marketing agencies, utilities, debt collection agencies, consumers, sellers and court records, business transaction information, such as, buyer-seller relationship, social media reputation, social media data used to forecast sales growth, scanned documents and the like. It shall be noted that the borrower data as explained above includes both the primary data and the secondary data associated with the customer and is indicative of the behavior of the customer.

The data sources 402a, 402b, 402c, 402d, 402e, 402f are applied to signal transformers 404a, 404b. 404c, 404d, and 404e for processing the data sources 402a, 402b, 402c, 402d, 402e, 402f. The signal transformers 404a, 404b, 404c, 404d, 404e perform mathematical operations on the data sources 402a, 402b, 402c, 402d, 402e, 402f to identify statistical data such as, DSO, variance. In an example, the signal transformers 404a, 404b, 404c, 404d, and 404e extract one or more features from the statistical data that represent behavior of the customer. The one or more features are transformed data signals that correspond to the data sources 402a, 402b, 402c, 402d, 402e, 402f.

The transformed signals from the signal transformers 404a, 404b, 404c, 404d, 404e are applied to machine learning models 406a. 406b, 406c and 406d. The machine learning models 406a, 406b. 406c and 406d are configured to learn and make predictions from the transformed signals based on the data sources 402a, 402b, 402c, 402d, 402e, 402f. For example, the machine learning models 406a, 406b, 406c and 406d learn a behavior pattern from the transformed data signals that indicate historical data to predict future behavior of the customer and the risk metrics associated with the customer. The machine learning models 406a, 406b, 406c and 406d predict and compute risk score along critical points of supply chain life cycle. For example, at each point in the supply chain, the risk score associated with a risk metric is updated as the pipeline 400 has information about the preceding steps, changes or edits to the order, problems, etc. For example, in the supply chain process as follows, purchase order, shipment, goods receipt, invoice receipt, invoice approval, invoice payment, the goods receipt will have information of purchase order and shipment. However, at start of the supply chain, there is risk of the purchase order not converting to an invoice, but after the goods are delivered and the invoice is approved, that risk vanishes, and the only risks remaining would be dilution, late days, etc. This ensures that the pipeline 400 performs risk assessment after the purchase order is created, after shipment, after receipt of the products, after invoice is received, and after invoice approval and predictions on risk metrics made by the pipeline 400 are updated at every completion of every step in the supply chain.

The risk score computed by the machine learning models 406a, 406b, 406c and 406d are aggregated by a risk score module 408. The risk score module 408 computes an overall risk score based on risk value obtained from the machine learning models 406a. 406b, 406c and 406d. Examples of the risk score module 408 can be the risk score computation module 214 shown in FIG. 2.

FIGS. 5A and 5B are schematic representations of an invoice 500 and a payment receipt 530, respectively. The invoice 500 is merely for example representations only and it can be configured in a variety of ways. In the illustrated example of FIG. 5A, the invoice 500 includes an invoice ID section 502, an invoice date section 504, a customer ID section 506, an invoice due date section 508, an invoice amount section 510, a product type section 512 and an invoice notes section 514. The invoice ID section 502 includes an identifier to identify the invoice 500. The identifier can include numbers, alphabets, special characters, image codes, bar codes or a combination of the above. The invoice date section 504 indicates billing date of the invoice 500 and the customer ID section 506 comprises an identifier to recognize a customer associated with the invoice 500. The due date for the invoice 500 is displayed in the invoice due date section 508 and the invoice amount section 510 displays total amount of a product for which the invoice 500 was generated. The product type section 512 describes characteristics (physical attributes) of the product. The invoice notes section 514 includes notes pertaining to the product for which the invoice 500 was generated. It must be noted that the invoice 500 is shown for description purpose only and the invoice 500 may include fewer or more sections than the sections mentioned.

In the example illustration of FIG. 5B, the payment receipt 530 includes a payment ID section 532, a payment date section 534, a customer ID section 536, an invoice ID section 538, a payment amount section 540, a payment method section 542 and a payment notes section 544. The payment ID section 532 comprises an identifier for detecting payment made by a customer for a product. The payment date section 534 displays date on which payment was made for the product. The customer ID section 536 is used to identify and recognize customers based on a unique identifier assigned to each customer. The invoice ID section 538 corresponds to invoice ID in the invoice 500 for which the current payment is made. The payment amount section 540 displays current amount paid for the product against the invoice 500. The mode of payment (cash/cheque/online transaction) is mentioned in the payment method section 542. The payment notes section 544 includes additional notes about payment corresponding to the invoice 500 in the payment receipt 530. It must be noted that the payment receipt 530 depicted in FIG. 5B is shown for description purpose only and the payment receipt 530 may include fewer or more sections than the sections depicted.

Figure 6:
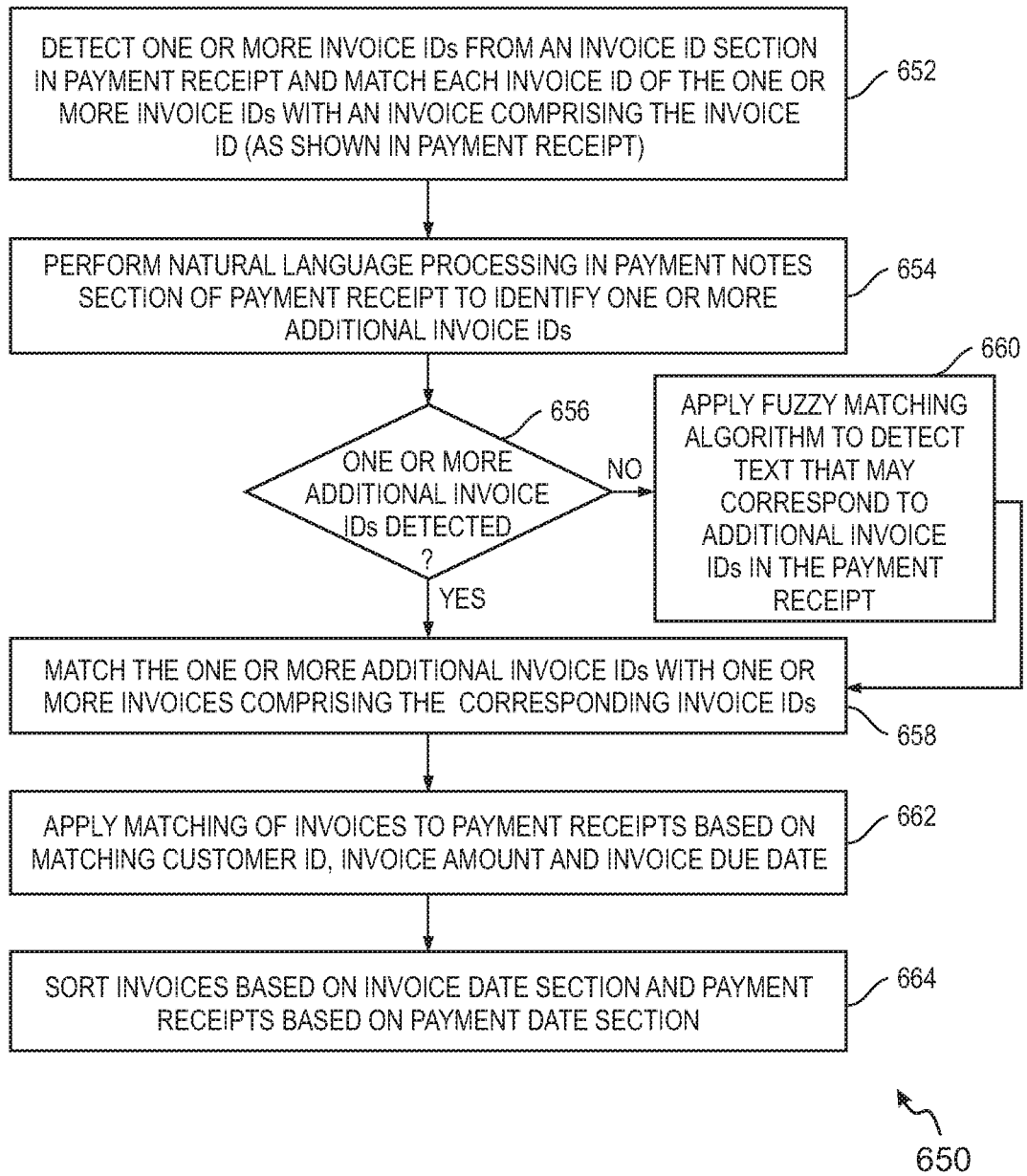
FIG. 6 illustrates a flow diagram of an example method of a matching algorithm to infer likelihood that payment is for a particular invoice, in accordance with an example embodiment.

Referring now to FIG. 6, a flow diagram of an example method 650 for a matching algorithm to infer likelihood that payment is for a particular invoice is illustrated in accordance with an example embodiment. The method 650 can be performed by a server system 1000 shown and explained with reference to FIG. 10.

At 652, the method 650 includes detecting one or more Invoice IDs from an invoice ID section in payment receipt and matching each Invoice ID of the one or more Invoice IDs with an invoice comprising the invoice ID (as shown in payment receipt). For example, if the payment receipt, such as, the payment receipt 630 (shown in FIG. 6B) includes an invoice ID '17251234', a server (e.g., the server system 1000) performing matching operation searches a database (memory) comprising invoices for an invoice with the invoice ID '17251234'.

At 654, the method 650 includes performing natural language processing in payment notes section of the payment receipt to identify one or more additional invoice IDs. The payment notes section 644 (shown in FIG. 6B) is scanned and computing techniques are applied on the scanned copy to interpret the payment notes section 644 in natural language. The natural language format of the scanned copy is used to identify and recognize additional invoice IDs, if present. The additional invoice IDs detected in the payment notes section 644 may link to one or more invoices that have not already been matched (at operation 652) based on the one or more invoice IDs detected in the Invoice ID section.

At 656, the method 650 includes checking if one or more additional invoice IDs are detected in the payment notes section. If additional invoice IDs are detected, operation at 658 is performed else operation at 660 is performed.

At 658, the method 650 includes matching the one or more additional invoice IDs with one or more invoices comprising the corresponding invoice IDs. In an example scenario, if additional invoice IDs, for example, Invoice ID 1734156 and Invoice ID 1742144 are detected in the payment notes section 644, the server (e.g., the server system 1000) is configured to search the database to determine the invoices that match with the additional invoice IDs (Invoice ID 1734156 and Invoice ID 1742144).

At 660, the method 650 includes applying fuzzy matching algorithm to detect text that may correspond to additional invoice IDs in the payment receipt. If additional invoice IDs have not been detected in the payment notes section 644 of the payment receipt 630, a fuzzy matching algorithm, such as, the Liechtenstein distance, is applied to detect text that may contain the additional invoice IDs anywhere in the payment receipt. If at least one additional invoice ID is detected using fuzzy matching algorithm, then operation at 662 is performed.

At 662, the method 650 includes applying matching of invoices to payment receipts based on matching customer ID, invoice amount and invoice due date. The invoices and the payment receipts that were matched based on invoice IDs are now matched to check additional details such as, customer ID, invoice amount and invoice due date. For instance, the customer ID section 606, the invoice amount section 610, the invoice due date section 608 of the invoice 600 are matched with the customer ID section 636, the payment amount section 640 and the payment date section 634 of the payment receipt 630, respectively. It must be noted that the invoice amount and the invoice due date can be allowed to deviate by some margin and may be determined by the server (e.g., the server 106 or the server system 1000) or pre-determined by risk engine computing risk metrics.

At 664, the method 650 includes sorting invoices based on invoice date section and payment receipts based on payment date section. In an embodiment, the invoices and payment receipts are arranged from the earliest date to the latest date (as read from the invoice date section 604 and the payment date section 634). The invoices that match with the payment receipts are grouped together. Sorting helps in identifying invoices and payment receipts corresponding to a customer (borrower) separately. For each customer, invoices and payments against the invoices are tracked as adding and subtracting to an account balance. Also, payment may be allocated to the earliest invoice (based on invoice date) that has an outstanding balance based on overall customer account balance.

Referring now to FIG. 7A, an example representation of a UI 700 displayed to the user 102 on a display screen of the electronic device 104 by the application interface 114 for receiving documents related to one or more assets for determining a credit rating is shown in accordance with an example embodiment of the present disclosure. It is noted that the user 102 and the application interface 114 are shown in FIG. 1. In an example scenario, after downloading of the application interface 114 from the risk management system 108 (shown in FIG. 1), an application icon may be displayed to the user 102 on the display screen of the electronic device 104. The application icon is not shown in FIG. 2A. The user 102 may provide a selection input on the application icon to invoke the application interface 114. The application interface 114, after invoking, may present one or more UIs for creating an account of the user 102. In some example embodiments, the creation of a user account may be precluded.

The UI 700 is depicted to include a header portion 702, a content portion 704 and a task bar 706. The header portion 702 is depicted to exemplarily display a title 708 associated with text 'RISK MANAGEMENT'. The header portion 702 also includes options 710, 712, 714, 716 and 718. The option 710 is depicted as a notification icon that enables the user 102 to view notifications generated by the application interface 114. The notifications may be displayed as an overlay on the UI 700 when the user 102 provides a selection input or click input on the option 710. The notifications may not only include messages from one or more financial institutions, such as, the financial institutions 116 indicating a loan pricing or successful approval of credit against the assets furnished by the user 102 but may also include status update of credit rating, request for additional documents and the like. The option 712 is depicted as a mail service icon that provisions a shortcut to compose, edit and send emails from the application interface 114 upon receiving a selection input or click input on the option 712. The option 714 is depicted as a calendar icon that enables the user 102 to view current day. Optionally, the user 102 can provide a selection input or click input on the option 714 to view calendar entries and/or reminders set on a specific day.

The header portion 702 also includes a profile tab 716 depicted by an image icon corresponding to the user 102. The user 102 can provide basic profile information, such as, name, contact and address of the user 102 by providing a click input or selection input on the profile tab 716. In some embodiments, the user 102 can provide links to connect to other social networking profiles of the user 102. The user 102 can also change or modify settings by providing preferences in the basic profile. The header portion 702 includes the option 718 at extreme right corner and is depicted as an export icon. The option 718 enables the user 102 to export data from the application interface 114 to external system or storage device in portable formats, such as Portable Document Format (PDF), Microsoft Excel Open XML Format (xlsx), etc.

The task bar 706 of the UI 700 depicts a plurality of options, such as option 720, 722, 724 and 726 related to high-level view of various features of the application interface 114 (shown as 'DASHBOARD'), an option for uploading one or more documents related to one or more assets (shown as 'UPLOAD DOCUMENT'), a preference for selecting one or more invoices from a collection of invoices exported by the user 102 to the application interface 114 (shown as 'INVOICES'), a preference for assigning access to documents uploaded or exported by the user 102 (shown as 'ACCESS'), respectively. The option 726 associated with text 'ACCESS' enables the user 102 to provide user preferences in setting limitation for selectively controlling access of the primary data uploaded by the user 102 on the application interface 114 by one or more financial institutions (e.g., the financial institutions 116).

It is noted that the options 720-726 are shown herein for illustration purpose and that the UI 700 may include more of fewer options than those depicted in the task bar 706. The user 102 may provide a touch or a click input on the options 720-726 to access further set of options for setting user preferences and/or accessing other documents, updating data fields, reviewing and editing data fields and viewing credit ratings. The selection of any of the options 720-726 may cause display of another UI capable of receiving user input, for example, selection input on the option 722 displays the UI 700. An example UI provisioned to the user 102 is shown in FIG. 7A.

The UI 700 may be displayed to the user 102 upon user selection of the option 722 associated with the label 'UPLOAD FILE'. It is noted that the provisioning of the upload file option is explained herein for illustration purposes and may not be considered as limiting the scope of the disclosure. Indeed, the UI 700 may be displayed to the user 102, either directly upon invoking the application interface 114 or by selection of other options or options with different labels then the labels explained herein.

The content portion 704 includes a progress tracker 728 depicting progress in submitting documents related to one or more assets against which the user 102 intends to receive a credit rating and acquire credit/financing. The progress tracker 728 displays progress to the user 102 by highlighting icons 730, 732, 734. The icon 730 associated with text 'UPLOAD' is highlighted when the user 102 accesses the UI 700 to upload documents related to the one or more assets. The icon 732 associated with text 'MAP FIELDS' is highlighted when data is extracted from the documents uploaded by the user 102 in the UI 700 and automatically updated in fields shown in UI 750 (shown in FIG. 7B). The icon 734 associated with text 'REVIEW' is highlighted when the user 102 saves the data after modifying the fields automatically updated in the UI 750.

The content portion 704 includes a work space 736 for uploading one or more documents. For example, the user 102 would upload invoices from the electronic device 104 to the application interface 114. The invoices could be open invoiced that have not been funded, invoices that have been funded but not repaid, and repayments. The work space 736 includes options 738, 740 that enable uploading of documents related to one or more assets for determining a credit rating for evaluating risk associated with financing the user 102. The option 738 is associated with text "DRAG A FILE HERE' enables the user 102 to drag and drop selected documents in the work space 736 related to the one or more assets. For example, the user 102 may drag and drop documents such as, invoices (invoice #1, invoice #2), purchase orders (purchase order #1) and shipment history (shipment history #3, shipment history #4) in the work space 736. The option 740 is associated with text 'SELECT A FILE FROM YOUR COMPUTER'. The user 102 may provide a touch or a click input on the tab 740 to selectively upload the one or more documents associated with the one or more assets against which financing is required. The selection of the tab 740 may cause display of another UI displaying a plurality of documents available on the device, for example, the electronic device 104. When the user 102 selects documents for upload, the application interface 114 may caused display of another UI displaying a plurality of data fields filled with information based on the one or more documents uploaded by the user 102 in the UI 700. An example UI provisioned to the user 102 is shown in FIG. 7B.

Referring now to FIG. 7B, an example representation of the UI 750 displayed to the user 102 on a display screen of the electronic device 104 by the application interface 114 for receiving primary information is shown in accordance with an example embodiment of the present disclosure. The UI 750 may be displayed to the user 102 upon the user 102 uploading one or more documents in the workspace 736 using either the option 738 or the option 740 (shown in FIG. 7A). It shall be noted that the UI 750 may be displayed to the user 102, either directly upon invoking the application interface 114 or by selection of other options (e.g., the option 738 or the option 740) or options with different labels then the labels explained herein.

The UI 750 of the application interface 114 includes the header portion 702, the task bar 706 and a content portion 752. The header portion 702 and the task bar 706 have already been explained with reference to FIG. 7A and description of the header portion 702 and the task bar 706 are omitted for the sake of brevity.

The content portion 752 includes a left part 754 and a right part 756. The left part 754 of the content portion 752 of the UI 750 is depicted to display data fields 758, 760, 762, 764, 766, 768, 770, 772, 774, 776, 777 for acquiring the primary data associated with the user 102 based on the documents uploaded by the user 102 on the UI 700 from the electronic device 104. Each data field from among the data fields 758, 760, 762, 764, 766, 768, 770, 772, 774, 776 and 777 is depicted to be associated with a text box. For example, the data field 758 is associated with a text box 778, the data field 760 is associated with a text box 780, the data field 762 is associated with a text box 782, the data field 764 is associated with a text box 784, the data field 766 is associated with a text box 786, the data field 768 is associated with a text box 788, the data field 770 is associated with a text box 790, the data field 772 is associated with a text box 792, the data field 774 is associated with a text box 794, the data field 776 is associated with a text box 796, the data field 777 is associated with a text box 797.

The text boxes 778, 780, 782, 784, 786, 788, 790, 792, 794, 796, 797 are either partially or completely updated based on the one or more documents uploaded by the user 102 in the UI 700 of the application interface 114. Accordingly, the application interface 114 is configured to extract data from the one or more documents uploaded by the user 102 in the UI 700 and automatically update the text boxes 778, 780, 782, 784, 786, 788, 790, 792, 794, 796, 797 corresponding to the data fields 758, 760, 762, 764, 766, 768, 770, 772, 774, 776 and 777. In an example, if the user 102 had uploaded an invoice with invoice ID (MX181234) in the UI 700, the application interface 114 extracts this data using various algorithms and fills out the text box 786 corresponding to the data field 766 ('Invoice ID') with data matching the invoice ID (MX181234). It shall be noted that the data provided by the user 102 in text boxes corresponding to the data fields 758, 760, 762, 764, 766, 768, 770, 772, 774, 776 and 777 constitute the primary data of the user 102. The text boxes 778, 780, 782, 784, 786, 788, 790, 792, 794, 796, 797 include a drop down menu that displays multiple options when the user 102 provides a click input/selection input on a corresponding text box. However, the user 102 can modify data in the text boxes 778, 780, 782, 784, 786, 788, 790, 792, 794, 796 and 797 by selecting an option from the drop down menu or edit the data by keying in the data corresponding to the data field.

The data field 758 associated with text 'Status' indicates status of the loan application submitted via the application interface 114. The text box 778 may be associated with options such as, 'view credit rating', 'queued for loan pricing', 'accept offer', and the like. The data field 760 associated with text 'Obligor Name' enables provisioning of the buyer/borrower name. More specifically, name of the user 102 is provided in the text box 780. The data field 762 associated with text 'Seller Name' indicates supplier name associated with the one or more assets in the text box 782. The data field 764 associated with text 'Seller Type' indicates supplier type or business field associated with the seller of the one or more assets in the text box 784. The data field 766 associated with text 'Invoice ID' indicates an identifier associated with the invoice uploaded by the user 102 in the text box 786. The data field 768 associated with text 'Invoice Issue Date' provides information on issue date of the invoice associated with the invoice ID of text box 786. The data field 770 associated with text 'Invoice Due Date' indicates a due date for payment of the invoice associated with the invoice ID (shown in text box 786) in the text box 790. The data field 772 associated with text 'Currency' indicates payment type for the invoice (of text box 786) in the text box 792. The data field 774 associated with text 'Amount' provides details of invoice amount/payment amount for the invoice (of text box 786) in the text box 794. The data field 776 associated with text 'Adjusted Due Date' depicts an adjusted due date based on payment history associated with the invoice. The data field 777 associated with text 'Adjusted amount' indicates any changes in invoice amount as paid by the user 102 for the invoice based on payment amount in a corresponding payment history. It shall be noted that the data fields 776 and 777 are not required data fields and the text boxes 796, 797 may be filled out with data only if the user 102 has uploaded invoices depicting some changes in the invoice due date/invoice amount.

The content portion 752 includes options 798, 799 associated with text 'SAVE', 'CANCEL', respectively. The user 102 can temporarily save the data provided in the text boxes 778, 780, 782, 784, 786, 788, 790, 792, 794, 796 and 797 corresponding to the data fields 758, 760, 762, 764, 766, 768, 770, 772, 774, 776 and 777 by providing a click input or selection input on the option 798. Alternatively, the user 102 can chose not to save the changes/modifications in the data provided in the text boxes 778, 780, 782, 784, 786, 788, 790, 792, 794, 796 and 797 by providing a click input or selection input on the option 799.

Figure 8A:
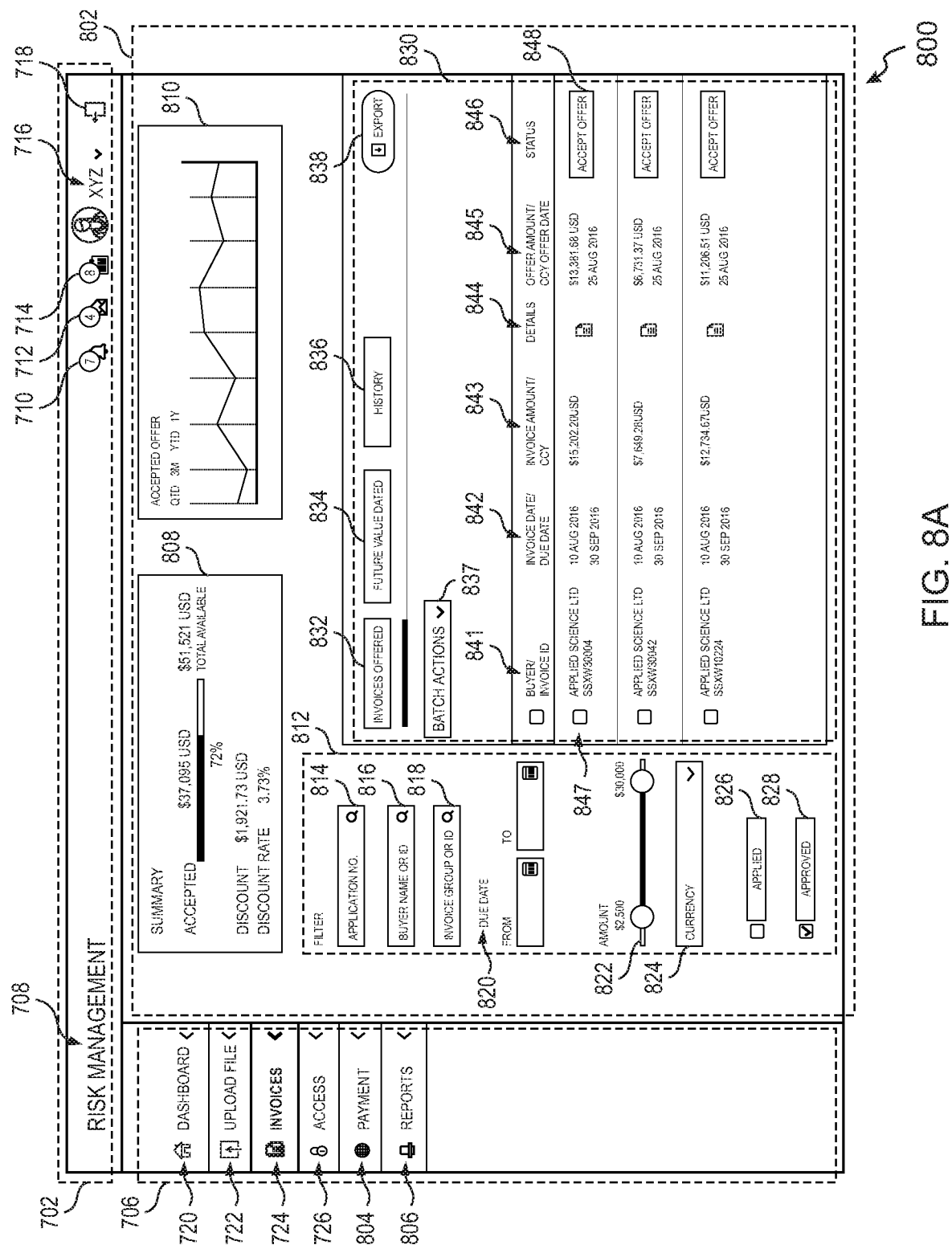
FIG. 8A illustrates an example representation of a UI displayed to a user on a display screen of an electronic device by an application interface depicting a plurality of invoices and pricing for the plurality of invoices, in accordance with an example embodiment.

Referring now to FIG. 8A, an example representation of a UI 800 displayed to the user 102 on a display screen of the electronic device 104 by the application interface 114 depicting a plurality of invoices and pricing for the plurality of invoices is shown in accordance with an example embodiment of the present disclosure. It is noted that the user 102 and the application interface 114 are shown in FIG. 1. In an example scenario, the UI 800 may be displayed to the user 102 upon user selection of the option 724 associated with the label 'INVOICES'. It is noted that the provisioning of the option 724 is explained herein for illustration purposes and may not be considered as limiting the scope of the disclosure. Indeed, the UI 800 may be displayed to the user 102 by selection of other options, for example, the option 726 or options with different labels then the labels explained herein.

The UI 800 is depicted to include the header portion 702, a content portion 802 and the task bar 706. The header portion 702 and the task bar 706 are explained with reference to FIG. 7A and description of the same is omitted herein for the sake of brevity. The task bar 706 of the UI 800 includes options 804, 806 among other options, such as the option 720, 722, 724 and 726. The option 726 enables display of one or more UIs depicting outstanding loans and recent payments (shown as 'PAYMENTS'). The option 804 enables access to reports generated by the application interface 114 (shown as 'REPORTS') based on the primary data and the secondary data associated with the user 102. The option 806 associated with text 'ACCESS' enables the user 102 to provide user preferences in setting limitation for selectively controlling access of the primary data uploaded by the user 102 on the application interface 114 by one or more financial institutions (e.g., the financial institutions 116).

The content portion 802 includes sections 808, 810, 812 and 830. The section 808 associated with text 'Summary' displays a visual representation of loan pricing amount ($37,095 USD) used by the user 102 of the total available loan pricing ($51, 521 USD) indicating that 72% of the financing that has been sanctioned against assets (invoices) displayed in the section 830 have been used by the user 102. Further, the section 808 also displays a discount amount ($1,921.73 USD) in the loan pricing and a discount rate (3.73%) below the visual representation. The section 810 displays a graph depicting the loan pricing amount accepted by the user 102 over a financial year on a monthly basis.

The section 812 associated with text 'FILTER' provides options for the user 102 to filter and view invoices based on various attributes such as, due date, amount, currency, status or search for a specific invoice by providing search input in search fields 814, 816, 818. The user 102 can provide a search string corresponding to an application number associated with financing request in the search field 814. The application interface 114 retrieves invoices associated with the application number (represented by the search string) and displays the invoices in the section 830. The search field 816 can be used to provide a search string associated with a buyer name or buyer ID. The application interface 114 retrieves and displays invoices associated with the buyer name in the section 830. The search field 818 can be used to search for specific invoices. Accordingly, the user 102 may provide an invoice ID or group ID corresponding to the specific ID such that the application interface 114 retrieves one or more invoices and displays the same in the section 830.

Moreover, the user 102 can search for invoices over a time period using an option 820. The option 820 associated with text 'Due Date' provisions an option for the user 102 to search for one or more invoices over a time frame in a calendar. For example, the user 102 can provide a start date and an end date using calendar tabs in the option 820. The option 822 associated with text 'Amount' includes two sliders capable of being slid from left to right to provide a selection on an upper bound and a lower bound on the invoice amount. The upper bound and the lower bound indicate a specific amount range and the application interface 114 retrieves invoices whose invoice amount lie between the lower bound and the upper bound. Further, the UI 800 provides an option 824 associated with text 'Currency' for the user 102 to search for invoices based on currency, for example, amount paid for invoices in Dollar, Euro. The user 102 can search for invoices based on their status using options 826, 828. The option 826 associated with text 'Applied' enables the user 102 to view invoices that are furnished for loan application when a click input or selection input is provided on the option 826. Similarly, the option 828 associated with text 'Approved' enables the user 102 to view invoices that are approved for loan pricing when a click input or selection input is provided on the option 828.

The section 830 includes options 832, 834, 836 for viewing invoices based on the options enabled by the user 102 in the section 812 (shown as 'Invoices Offered'), viewing invoices that are post-dated based on options selected/enabled in the section 812 (shown as 'Future Value Dated') and viewing history associated with invoices based on choices/options in the section 812 (shown as 'History'). The section 830 includes an option 838 associated with text 'Export'. The user 102 can provide a click input or selection input on the option 838 to export one or more documents to the application interface 114 from a device, such as, the electronic device 104 associated with the user 102. The section 830 includes an option 837 associated with text 'Batch Action'. The user 102 can provide a click input or selection input on the option 837 such as to accept many offers (listed in a table below) at once.

The section 830 includes a table providing information about the one or more invoices uploaded by the user 102 based on the options selected/enabled in the section 812 and/or option enabled amongst options 832, 834, 836. The table includes columns representing a buyer/invoice ID field 841, an invoice date field 842, an invoice amount field 843, a details field 844, an offer amount/offer date field 845 and a status data field 846. The table may include as many rows as number of invoices that are to be listed based on the selection input received from the user 102 on the section 812. As an example, a row 847 depicts that for a buyer (shown as 'Applied Science Ltd.'), one of the invoice ID is SSXW30004 bearing invoice date 10 Aug. 2016 and due date on 30 Sep. 2016 for an invoice amount $15, 202.20 USD. The details of the invoice or the invoice (invoice ID: SSXW30004) can be accessed by clicking on an option provided below the details field 844. As seen in FIG. 8A, an offer amount for the corresponding invoice associated with invoice ID (SSXW30004), is priced at $13, 381.68 USD and the offer amount is expected to be offered on 25 Aug. 2016. The user 102 can choose to accept the offer amount for the invoice (invoice ID SSXW30004) by providing a click input or selection input on an option 848 associated with text 'Accept Offer'.

The risk metrics calculated based on the invoices uploaded by the user 102 in the application interface 114 can be viewed when the user 102 provides a click input or selection input on the option 804. An example of an UI provisioned to the user 102 upon providing a selection input on the option 804 is shown and explained with reference to FIG. 8B.

Figure 8B:
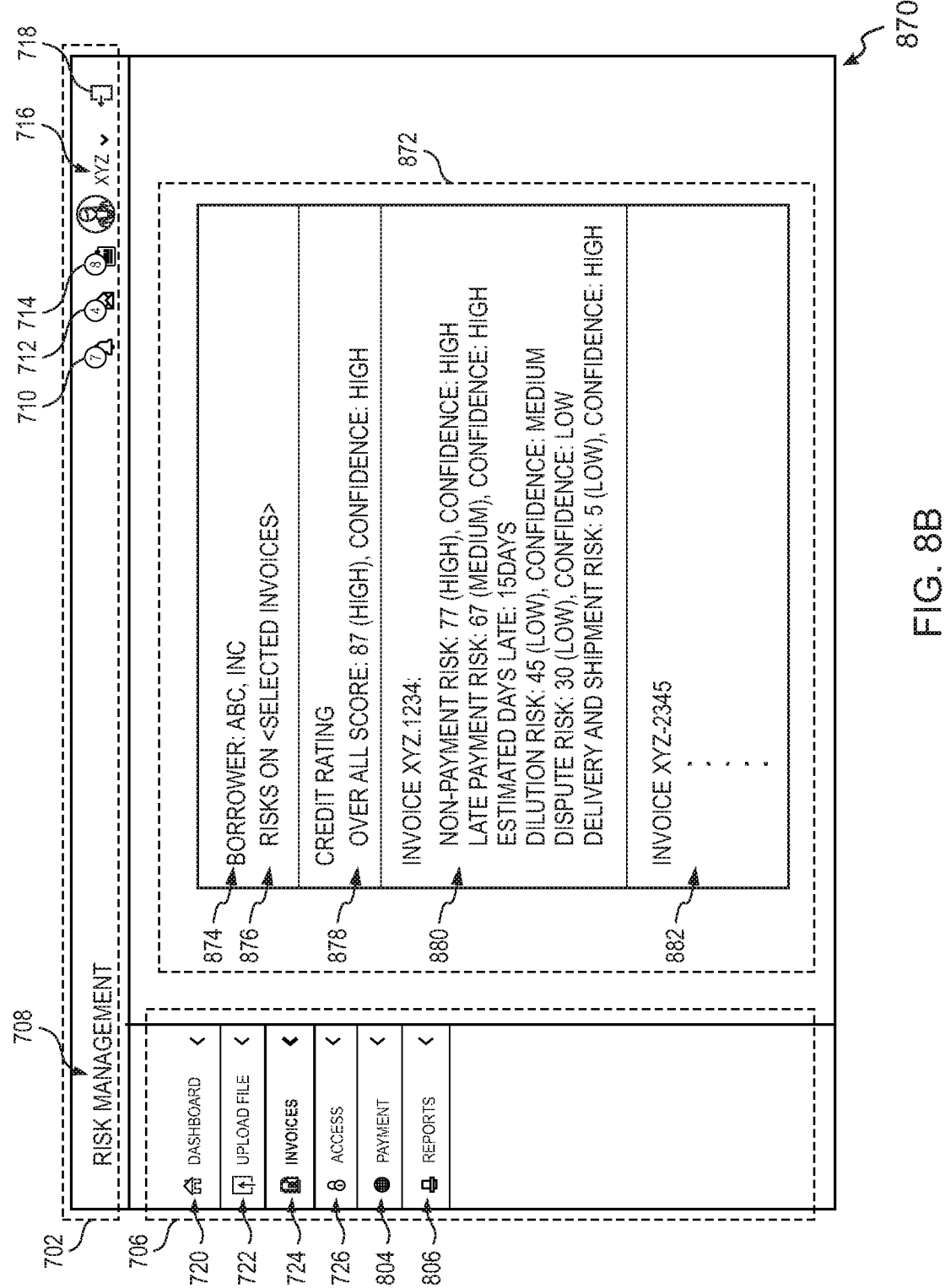
FIG. 8B illustrates an example representation of a UI displayed to the user on a display screen of the electronic device by the application interface depicting credit information and one or more risk metrics of an entity, in accordance with an example embodiment of the present disclosure.

Referring now to FIG. 8B, an example representation of a UI 870 displayed to the user 102 on a display screen of the electronic device 104 by the application interface 114 depicting credit information and one or more risk metrics of an entity is shown in accordance with an example embodiment of the present disclosure. In an example scenario, the UI 870 may be displayed to the user 102 upon user selection of the option 804 associated with the label 'REPORTS'. It is noted that the provisioning of the option 804 is explained herein for illustration purposes and may not be considered as limiting the scope of the disclosure. Indeed, the UI 870 may be displayed to the user 102 by selection of other options or options with different labels then the labels explained herein. The credit information and the risk metrics are computed by the risk computing system 200 shown and explained with reference to FIG. 2.

The UI 870 is depicted to include the header portion 702, a content portion 872 and the task bar 706. The header portion 702 and the task bar 706 are explained with reference to FIG. 7A and description of the same is omitted herein for the sake of brevity. The content portion 872 includes sections 874, 876, 878,880 and 882. The section 874 associated with text 'BORROWER' displays name of the borrower. For example, the section 874 displays name of business institution as 'ABC. Inc'. The borrower name is as provided by the borrower in the application interface 114, for example, the obligor name provided in text box 760 (shown in FIG. 7B).

The section 876 is associated with a text 'Risks on" and displays invoices that were uploaded by the borrower in the UI 700. The section 878 appears below the section 876 and displays credit rating of the borrower. As seen in FIG. 8B, an overall risk score (87) and an associated confidence measure ('high') is displayed beside the overall risk score. The risk score of 87 with high confidence measure indicates a high risk that the borrower ('ABC. Inc') is not likely to pay the loan.

Additionally or optionally, the section 880 displays various risk metrics, such as, non-payment risk, late payment risk, dilution risk, dispute risk, delivery and shipment risk and an associated confidence measure with the risk metrics. As shown in the UI 870, the non-payment risk score is 77 with a 'high' confidence measure and the late payment risk score is 67 with a 'high' confidence measure. The section 880 also displays estimated late payment in days as 15 days. The non-payment risk score and the late payment risk score indicate that riskiness in lending to the borrower is due to late payment and non-payment of loan with 'high' confidence measure. The UI 870 displays dilution risk of 45 with a 'medium' confidence, dispute risk of 30 with 'low' confidence measure and shipment and delivery risk as 5 with 'high' confidence measure.

The section 882 displays list of invoices that were uploaded by the borrower in the application interface 114. As shown in FIG. 8B, the borrower has uploaded an invoice associated file name 'INVOICE XYZ-2345'. It must be noted that the list of invoices in the section 882 are shown for description purposes only and the borrower (e.g., the user 102) may choose to upload one or more purchase orders as well against which the borrower requires financing.

Figure 9:
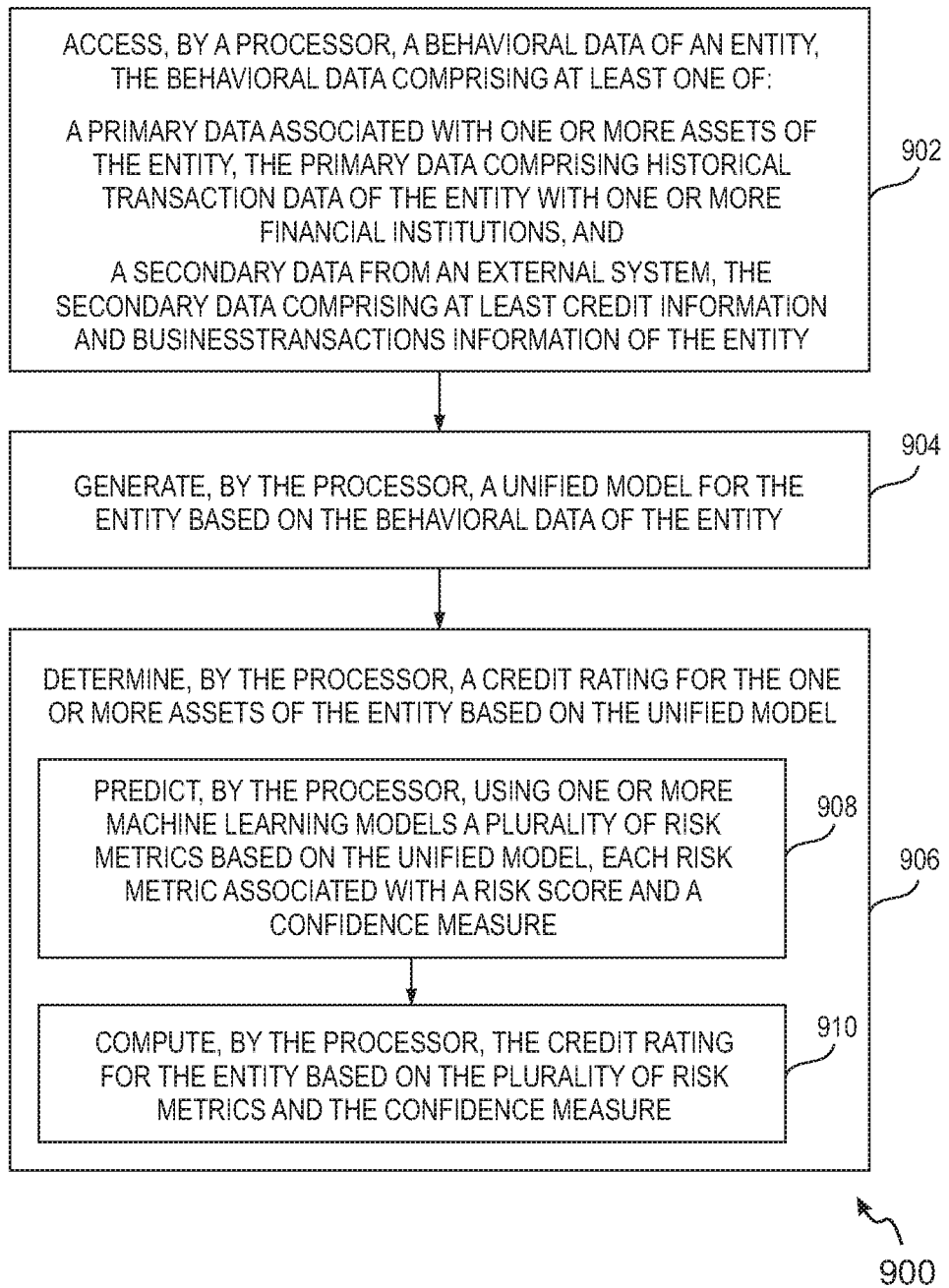
FIG. 9 illustrates a flow diagram of a method for assessing performance and determining risk in financing supply chain, in accordance with an example embodiment.

Referring now to FIG. 9, a flow diagram of a method 900 for assessing performance and determining risk in financing supply chain is illustrated in accordance with an example embodiment of the present disclosure. The various steps and/or operations of the flow diagram, and combinations of steps/operations in the flow diagram, may be implemented by, for example, hardware, firmware, a processor, circuitry and/or by the processing module in a user device and/or by a different electronic device associated with the execution of software that includes one or more computer program instructions. The method 900 starts at operation 902.

At operation 902, the method 900 includes accessing, by a processor, a behavioral data of an entity. The behavioral data comprises at least one of a primary data and a secondary data. The primary data is associated with one or more assets of the entity and comprises historical transaction data of the entity with one or more financial institutions. For example, the entity may upload invoice documents (invoice #451, invoice #123) associated with the assets depicting transaction data of the entity against which the entity requests for financing. The secondary data is accessed from an external system and comprises at least credit information and business transactions information of the entity. In some example embodiments, the secondary data is accessed from a credit bureau (e.g., the credit bureau 112) that gathers credit information and business transaction information of a plurality of users from a plurality of financial institutions and data furnishes providing alternate data sources associated with the plurality of users. It shall be noted that the secondary data is not limited to the credit information acquired from the credit bureau 112 but also includes business transaction information, such as, buyer-seller relationship, social media reputation, social media data used to forecast sales growth, scanned documents and the like. Optionally, the credit bureau 112 may access data sources such as, creditors, lenders, marketing agencies, utilities, debt collection agencies, consumers, sellers and court records for acquiring the secondary information associated with the plurality of users. The credit bureau 112 provides the secondary information upon receipt of a user request for performing a credit risk assessment and determining the credit rating of the borrower.

In an embodiment, entity information such as, personal identification information is removed from the primary information and the secondary information. In an example scenario, an anonymization algorithm is employed to capture essence of behavior of the entity after removing information such as, address, contact number of the entity. The primary information and the secondary information are fused together to generate a behavioral data for the entity using the anonymization algorithm.

At operation 904, the method 900 includes generating, by the processor, a unified model for the entity based on the behavioral data of the entity. The behavioral data is assigned an identifier that identifies the entity based on the behavioral data. The unified model is stored in the pattern repository 212 along with the identifier. In cases where there is insufficient secondary data, a look-alike modeling is performed to generate a unified model corresponding to the entity. The look-alike modeling has been explained with reference to FIG. 2.

At operation 906, the method 900 includes determining, by the processor, a credit rating for the one or more assets of the entity based on the unified model. The operations of the method 906 can be performed either in a parallel manner or sequential manner by operations 908 and 910.

At operation 908, the method 900 includes predicting, by the processor, using one or more machine learning models a plurality of risk metrics based on the unified model. Each risk metric is associated with a risk score and a confidence measure. In an example scenario, risk metrics such as a non-payment risk, a late payment risk, a dilution risk, a dispute risk, a fraud risk, a delivery risk and a shipment quality risk are predicted for the entity based on the unified model. For instance, the processor predicts the plurality of risk metrics based on the behavioral data associated with the unified model.

At operation 910, the method 900 includes computing, by the processor, the credit rating for the entity based on the plurality of risk metrics and the confidence measure. The plurality of risk metrics are combined together using a weighing factor, such as a cost associated with each of the risk metric. Accordingly, the credit rating is a single weighted risk score generated based on weighing individual risk scores. The credit rating can be used for decision-making by the financial institution 116 offering a pricing for the one or more assets furnished by the entity.

Figure 10:
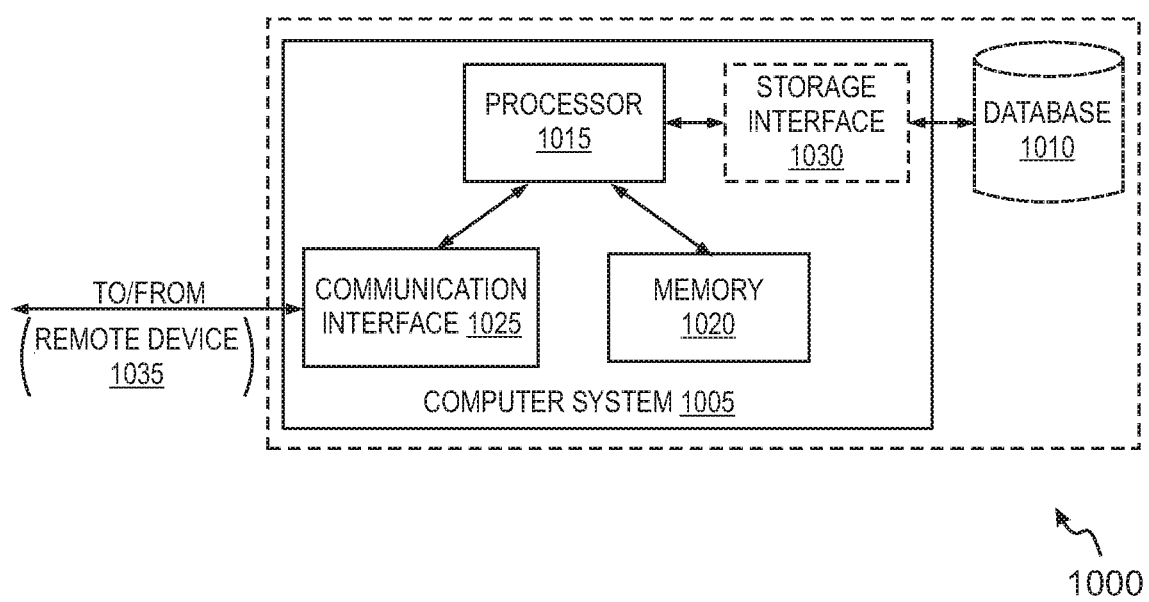
FIG. 10 illustrates a schematic block diagram of a server, in accordance with an example embodiment.

FIG. 10 is a block diagram of a server system 1000 configured to assess performance and risk in a financing supply chain, in accordance with an example embodiment. An example of the server system 1000 is the server 106 shown in FIG. 1. The server system 1000 includes a computer system 1005 and a database 1010.

The computer system 1005 includes at least one processor 1015 for executing instructions. Instructions may be stored in, for example, but not limited to, a memory 1020. The processor 1015 may include one or more processing units (e.g., in a multi-core configuration) for executing operations of a risk management system such as, the risk management system 108 embodied in the server 106.

The processor 1015 is operatively coupled to a communication interface 1025 such that the computer system 1005 is capable of communicating with a remote device 1035 such as the credit bureau 112, the electronic device 104 or communicate with any entity within the network 110. For example, the communication interface 1025 receives a request for determining credit rating based on primary information and secondary information of a borrower. Further, the communication interface 1025 may send a request to access secondary information associated with the borrower and receive the secondary information from the credit bureau 112.

The processor 1015 may also be operatively coupled to the database 1010. The database 1010 is any computer-operated hardware suitable for storing and/or retrieving data, such as, but not limited to, behavioral data of a plurality of users and a plurality of unified models corresponding to the plurality of behavioral data. Further, the database 1010 may also store primary information such as but not limited to a plurality of invoices, purchase orders uploaded by the borrower and transaction details associated with the borrower at the plurality of financial institutions. The database 1010 may also store a table comprising information related to a plurality of invoice IDs, invoice date, invoice amount, due date, amount paid, offer amount (loan pricing amount), buyer name, buyer type, status and payment method. The database 1010 is configured to store an instance of the application interface 114 and provides the instance to device, for example, the electronic device 104 upon receipt of user request. The database 1010 may also include instructions for determining the credit rating and predict risk scores and confidence measure associated with a plurality of risk metrics based on the unified model. The database 1010 may include multiple storage units such as hard disks and/or solid-state disks in a redundant array of inexpensive disks (RAID) configuration. The database 1010 may include a storage area network (SAN) and/or a network attached storage (NAS) system.

In some embodiments, the database 1010 is integrated within the computer system 1005. For example, the computer system 1005 may include one or more hard disk drives as the database 1010. In other embodiments, the database 1010 is external to the computer system 1005 and may be accessed by the computer system 1005 using a storage interface 1030. The storage interface 1030 is any component capable of providing the processor 1015 with access to the database 1010. The storage interface 1030 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing the processor 1015 with access to the database 1010.

The processor 1015 is configured to access primary data and secondary data associated with an entity. The processor 1015 is further configured to implement an anonymization algorithm for fusing the primary data and the secondary data such as to generate a behavioral data corresponding to the entity. The processor 1015 is further configured to perform one or more of the functions such as: determine similarity measure between the behavioral data of the entity and a plurality of behavioral data associated with a plurality of entities to perform a look-alike modeling, generate a unified model based on the behavioral data, determine a plurality of risk metrics in terms of risk score and an associated confidence measure and combine the plurality of risk metrics using cost weights to determine credit rating of the entity. The processor 1015 may also be configured to notify the credit rating and the risk metrics to one or more financial institutions and receive a loan pricing for the entity based on the behavioral data of the entity via the communication interface 1025.

It will be appreciated that many functionalities of the server system 1000 can be performed by electronic devices, such as the electronic device 104 or a combination thereof. Any variation in terms of functionalities performed at either the electronic device 104 or the server 106 is within scope of this description.

FIG. 11 is a schematic block diagram of a mobile device 1100 that is capable of implementing embodiments for accessing an application interface in the mobile device 1100. It should be understood that the mobile device 1100 as illustrated and hereinafter described is merely illustrative of one type of device and should not be taken to limit the scope of the embodiments. As such, it should be appreciated that at least some of the components described below in connection with the mobile device 1100 may be optional and thus in an example embodiment may include more, less or different components than those described in connection with the example embodiment of the FIG. 11. As such, among other examples, the mobile device 1100 could be any of a mobile electronic device, for example, personal digital assistants (PDAs), mobile televisions, gaming devices, cellular phones, tablet computers, laptops, mobile computers, cameras, mobile digital assistants, or any combination of the aforementioned, and other types of communication or multimedia devices.

The illustrated mobile device 1100 includes a controller or a processor 1102 (e.g., a signal processor, microprocessor, ASIC, or other control and processing logic circuitry) for performing such tasks as signal coding, data processing, image processing, input/output processing, power control, and/or other functions. An operating system 1104 controls the allocation and usage of the components of the mobile device 1100 and support for one or more applications programs (see, applications 1106), such as the application interface 114 for assessing performance and determining risk in financing supply chain of an entity. Additionally, the applications interface includes provisions to share the performance (credit rating) of the entity with one or more financial institutions and receive a loan pricing based on the performance from the financial institutions 116. In addition, to reporting and retrieving the crowd information, the application programs can include common mobile computing applications (e.g., telephony applications, E-mail applications, calendars, contact managers, web browsers, messaging applications) or any other computing application.

The illustrated mobile device 1100 includes one or more memory components, for example, a non-removable memory 1108 and/or a removable memory 1110. The non-removable memory 1108 can include RAM, ROM, flash memory, a hard disk, or other well-known memory storage technologies. The removable memory 1110 can include flash memory, smart cards, or a Subscriber Identity Module (SIM). The one or more memory components can be used for storing data and/or code for running the operating system 1104 and the applications 1106. Example of data can include web pages, text, images, sound files, image data, video data, or other data sets to be sent to and/or received from one or more network servers or other devices via one or more wired or wireless networks. The mobile device 1100 may further include a user identity module (UIM) 1112. The UIM 1112 may be a memory device having a processor built in. The UIM 1112 may include, for example, a subscriber identity module (SIM), a universal integrated circuit card (UICC), a universal subscriber identity module (USIM), a removable user identity module (R-UIM), or any other smart card. The UIM 1112 typically stores information elements related to a mobile subscriber. The UIM 1112 in form of the SIM card is well known in Global System for Mobile Communications (GSM) communication systems, Code Division Multiple Access (CDMA) systems, or with third-generation (3G) wireless communication protocols such as Universal Mobile Telecommunications System (UMTS), CDMA9000, wideband CDMA (WCDMA) and time division-synchronous CDMA (TD-SCDMA), or with fourth-generation (4G) wireless communication protocols such as LTE (Long-Term Evolution).

The mobile device 1100 can support one or more input devices 1120 and one or more output devices 1130. Examples of the input devices 1120 may include, but are not limited to, a touchscreen 1122 (e.g., capable of capturing finger tap inputs, finger gesture inputs, multi-finger tap inputs, multi-finger gesture inputs, or keystroke inputs from a virtual keyboard or keypad), a microphone 1124 (e.g., capable of capturing voice input), a camera module 1126 (e.g., capable of capturing still picture images and/or video images) and a physical keyboard 1128. Examples of the output devices 1130 may include, but are not limited to a speaker 1132 and a display 1134. Other possible output devices (not shown in the FIG. 11) can include piezoelectric or other haptic output devices. Some devices can serve more than one input/output function. For example, the touchscreen 1122 and the display 1134 can be combined into a single input/output device.

A wireless modem 1140 can be coupled to one or more antennas (not shown in the FIG. 11) and can support two-way communications between the processor 1102 and external devices, as is well understood in the art. The wireless modem 1140 is shown generically and can include, for example, a cellular modem 1142 for communicating at long range with the mobile communication network, a Wi-Fi compatible modem 1144 for communicating at short range with an external Bluetooth-equipped device or a local wireless data network or router, and/or a Bluetooth-compatible modem 1146. The wireless modem 1140 is typically configured for communication with one or more cellular networks, such as a GSM network for data and voice communications within a single cellular network, between cellular networks, or between the communication system and a public switched telephone network (PSTN).

The mobile device 1100 can further include one or more input/output ports 1150, a power supply 1152, one or more sensors 1154 for example, an accelerometer, a gyroscope, a compass, or an infrared proximity sensor for detecting the orientation or motion of the mobile device 1100, a transceiver 1156 (for wirelessly transmitting analog or digital signals) and/or a physical connector 1160, which can be a USB port, IEEE 1394 (FireWire) port, and/or RS-232 port. The illustrated components are not required or all-inclusive, as any of the components shown can be deleted and other components can be added.

With the application (see 1106) and/or other software or hardware components, the mobile device 1100 can implement the technologies described herein. For example, the processor 1102 can display one or more UIs for acquiring primary data associated with transaction data such as, invoices, payment history, and shipment history from the entity, display a plurality of risk metrics associated with the entity and display loan pricing (offer amount) for the entity based on the behavioral data of the entity.

Although the mobile device 1100 is illustrated in FIG. 11 in form of a smartphone, but more particularly, the techniques and solutions described herein can be implemented with connected devices having other screen capabilities and device form factors, such as a tablet computer, a smart device, and the like. Without in any way limiting the scope, interpretation, or application of the claims appearing below, a technical effect of one or more of the example embodiments disclosed herein is to provide a method and system for assessing performance and risk in financing supply chain using the mobile device 1100 via the application 1106.

Various example embodiments disclosed herein are capable of assessing performance and risk in financing supply chain. Additionally, a borrower can acquire information on lending institutions that are willing to provide financing against assets disclosed by the borrower. Various example embodiments provide systems for computing risk metrics for providing financing against assets provided by the borrower. The risk metrics provide a risk score for each risk metric and an associated confidence measure indicating the riskiness of financing the borrower (business institution). Further, the data fusion model implements algorithms for anonymization of the borrower. The data fusion model removes PII from borrower data associated with the borrower. This ensures that privacy is not violated but helps learn salient features that characterize payment delinquency risks. The privacy preserving algorithm alleviates bank's concern of sharing data with the risk computing system us and allows banks to meet compliance and regulatory requirements. Moreover, lookalike modeling technique enables evaluating riskiness of new business institutions with no prior history.

The present disclosure is described above with reference to block diagrams and flowchart illustrations of method and system embodying the present disclosure. It will be understood that various block of the block diagram and flowchart illustrations, and combinations of blocks in the block diagrams and flowchart illustrations, respectively, may be implemented by a set of computer program instructions. These set of instructions may be loaded onto a general purpose computer, special purpose computer, or other programmable data processing apparatus to cause a device, such that the set of instructions when executed on the computer or other programmable data processing apparatus create a means for implementing the functions specified in the flowchart block or blocks. Although other means for implementing the functions including various combinations of hardware, firmware and software as described herein may also be employed.

Various embodiments described above may be implemented in software, hardware, application logic or a combination of software, hardware and application logic. The software, application logic and/or hardware may reside on at least one memory, at least one processor, an apparatus or, a non-transitory computer program product. In an example embodiment, the application logic, software or an instruction set is maintained on any one of various conventional computer-readable media. In the context of this document, a "computer-readable medium" may be any non-transitory media or means that can contain, store, communicate, propagate or transport the instructions for use by or in connection with an instruction execution system, apparatus, or device, such as a computer, with one example of a system described and depicted in FIG. 10. A computer-readable medium may comprise a computer-readable storage medium that may be any media or means that can contain or store the instructions for use by or in connection with an instruction execution system, apparatus, or device, such as a computer.

The foregoing descriptions of specific embodiments of the present disclosure have been presented for purposes of illustration and description. They are not intended to be exhaustive or to limit the present disclosure to the precise forms disclosed, and obviously many modifications and variations are possible in light of the above teaching. The embodiments were chosen and described in order to best explain the principles of the present disclosure and its practical application, to thereby enable others skilled in the art to best utilize the present disclosure and various embodiments with various modifications as are suited to the particular use contemplated. It is understood that various omissions and substitutions of equivalents are contemplated as circumstance may suggest or render expedient, but such are intended to cover the application or implementation without departing from the spirit or scope of the invention.

What is claimed is:

1. A computer-implemented method, comprising:
displaying, by a processor, one or more user interfaces (UIs) for receiving primary data pertaining to the one or more assets through an application interface using a user device;
accessing, by the processor, a behavioral data of an entity, the behavioral data comprising:
a primary data associated with one or more assets of the entity, wherein the primary data comprises historical transaction data of the entity with one or more financial institutions, a payment history of invoice, past purchase orders, and a shipment history; and
a secondary data sourced from an external system, wherein the secondary data comprises at least a credit information, a business transaction information of the entity, and one or more of: a social media data, a buyer-seller relationship data, and an estimated purchase volume data, and wherein the business transaction information is acquired from alternate data sources that are not traditionally used by banks and funders to detect risk factors;
generating, by the processor, a unified model for the entity based on the behavioral data of the entity;
implementing, by the processor, an anonymization algorithm for assigning an anonymized ID to the behavioral data;
determining, by the processor, a credit rating for the one or more assets of the entity based on the unified model by performing at least:
predicting, by the processor, using one or more machine learning models a plurality of risk metrics based on the unified model, each risk metric associated with a risk score and a confidence measure, wherein the risk score is computed for each risk metric as a numerical value, and wherein the confidence measure is one of low, medium, or high and is based on liability for the risk score; and
computing, by the processor, the credit rating for the entity based on the plurality of risk metrics and the confidence measure.

2. The method as claimed in claim 1, further comprising:
determining, by the processor, a similarity measure for the behavioral data by comparing the behavioral data with a plurality of unified models in a pattern repository, each unified model associated with the behavioral data of the entity of a plurality of entities; and
identifying, by the processor, at least one unified model from the pattern repository that matches the behavioral data of the entity, wherein the at least one unified model is determined based on the similarity measure.

3. The method as claimed in claim 2, further comprising:
providing, by the processor, the credit rating of the entity to a plurality of financial institutions; and
receiving, by the processor, a pricing from at least one financial institution for the one or more assets of the entity.

4. The method as claimed in claim 3, further comprising:
facilitating, by the processor, display of the pricing for the one or more assets of the entity, wherein the pricing is received from the at least one financial institution.

5. The method as claimed in claim 2, further comprising:
assigning, by the processor, an identifier for the behavioral data of the entity upon removing entity information from the behavioral data; and
storing, by the processor, the unified model of the entity in the pattern repository.

6. The method as claimed in claim 1, wherein the plurality of risk metrics comprises one or more of: a non-payment risk; a late payment risk; a dilution risk; a dispute risk; a fraud risk; a delivery risk; and a shipment quality risk.

7. The method as claimed in claim 1, wherein the secondary data further comprises one or more of: scanned documents; a size of the entity; years since incorporation of the entity; estimated invoice volume; historical and projected profit; top historical vendors; and top historical suppliers.

8. The method as claimed in claim 7, further comprising:
reading, by the processor, one or more scanned documents associated with the one or more assets of the entity by performing natural language processing, the one or more scanned documents comprising invoice documents, payment documents, purchase order documents and shipment history documents;
matching, by the processor, each invoice document with at least one of a payment document, a purchase order document and a shipment history document; and
interpreting, by the processor, the secondary data from the one or more scanned documents based on the matching.

9. The method as claimed in claim 1, further comprising:
facilitating, by the processor, an application interface for the entity to provide at least a part of the primary data associated with the one or more assets of the entity.

10. A system, comprising:
a communication interface;
a memory configured to store instructions and one or more machine learning models; and
a processor in operative communication with the memory and the communication interface, the processor configured to execute the stored instructions and the one or more machine learning models to perform at least in part:
display one or more user interfaces (UIs) for receiving primary data pertaining to the one or more assets through an application interface using a user device;
access a behavioral data of an entity via the communication interface, the behavioral data comprising:
a primary data associated with one or more assets of the entity, wherein the primary data comprises a historical transaction data of the entity with one or more financial institutions, a payment history of invoice, past purchase orders, and a shipment history; and a secondary data sourced from an external system, wherein the secondary data comprises at least a credit information, a business transaction information of the entity, and one or more of: a social media data, a buyer-seller relationship data, and an estimated purchase volume data, and wherein the business transaction information is acquired from alternate data sources that are not traditionally used by banks and funders to detect risk factors;

upon discarding personal identity information of the entity, generate a unified model based on the behavioral data of the entity, the unified model associated with an identifier;

implement an anonymization algorithm for assigning an anonymized ID to the behavioral data;

predict a plurality of risk metrics based on the unified model using the one or more machine learning models, each risk metric associated with a risk score and a confidence measure, wherein the risk score is computed for each risk metric as a numerical value, and wherein the confidence measure is one of low, medium, or high and is based on liability for the risk score;

provide the plurality of risk metrics associated with the one or more assets of the entity to a plurality of financial institutions; and receive a pricing for the one or more assets of the entity via the communication interface from at least one financial institution of the plurality of financial institutions.

11. The system as claimed in claim 10, wherein the system is further caused to:

determine a similarity measure for the behavioral data by comparing the behavioral data with a plurality of unified models in a pattern repository, each unified model associated with the behavioral data of the entity of a plurality of entities; and identify at least one unified model from the pattern repository that matches the behavioral data of the entity, wherein the at least one unified model is determined based on the similarity measure.

12. The system as claimed in claim 11, wherein the system is further caused to store the unified model of the entity in the pattern repository.

13. The system as claimed in claim 10, wherein the plurality of risk metrics comprises one or more of: a non-payment risk; a late payment risk; a dilution risk; a dispute risk; a fraud risk; a delivery risk; and a shipment quality risk.

14. The system as claimed in claim 10, wherein the secondary data further comprises one or more of: scanned documents; a size of the entity; years since incorporation of the entity; estimated invoice volume; historical and projected profit; top historical vendors; and top historical suppliers.

15. The system as claimed in claim 10, wherein system is further caused to: read one or more scanned documents associated with the one or more assets of the entity by performing natural language processing, the one or more scanned documents comprising invoice documents, payment documents, purchase order documents and shipment history documents;

match each invoice document with at least one of a payment document, a purchase order document and a shipment history document; and interpret the secondary data from the one or more scanned documents based on matching.

16. An automated risk management system, comprising:

an application configured to display, one or more user interfaces (UIs) for receiving primary data pertaining to the one or more assets through a user device;

a data source module configured to access at least one of:

a primary data associated with one or more assets of an entity, wherein the primary data comprises historical transaction data of the entity with one or more financial institutions, a payment history of invoice, past purchase orders, and a shipment history; and a secondary data sourced from an external system, wherein the secondary data comprises at least a credit information, a business transaction information of the entity, and one or more of: a social media data, a buyer-seller relationship data, and an estimated purchase volume data, and wherein the business transaction information is acquired from alternate data sources that are not traditionally used by banks and funders to detect risk factors;

a data fusion module communicably coupled to the data source module, the data fusion module configured to:

remove personal identity information from the primary data and the secondary data; and upon removing the personal identity information, generate a behavioral data for the entity based on the primary data and the secondary data, the behavioral data associated with an identifier for identifying the entity;

a risk engine configured to generate a unified model for the entity based on the behavioral data;

a data fusion module configured to implement an anonymization algorithm for assigning an anonymized ID to the behavioral data; and a risk score computation module configured to compute a credit rating for the one or more assets of the entity by predicting a plurality of risk metrics based on the unified model, each risk metric associated with a risk score and a confidence measure, wherein the risk score is computed for each risk metric as a numerical value, and wherein the confidence measure is one of low, medium, or high and is based on liability for the risk score.

17. The automated risk management system as claimed in claim 16, wherein the risk engine further comprises a pattern repository, the pattern repository comprising:

a historical data associated with each entity of a plurality of entities, the historical data comprising a credit information; and a plurality of unified models, each unified model associated with the behavioral data of each of the plurality of entities.

18. The automated risk management system as claimed in claim 16, wherein the risk engine is further caused to:

determine a similarity measure for the behavioral data by comparing the behavioral data with each unified model of a plurality of unified models in a pattern repository; and determine at least one unified model from the pattern repository that matches the behavioral data of the entity, wherein the at least one unified model is determined based on the similarity measure.

* * * * *